United States Patent
Kodaganur et al.

(10) Patent No.: US 8,479,218 B2
(45) Date of Patent: Jul. 2, 2013

(54) AUTOMATICALLY ARRANGING OBJECTS IN A GRAPHICAL PROGRAM BLOCK DIAGRAM

(75) Inventors: Anand Kodaganur, Bangalore (IN); Arjun J. Singri, Bangalore (IN); Ashwin Prasad, Bangalore (IN); Karthik S. Murthy, Bangalore (IN); Craig Smith, Austin, TX (US); Bharath Dev, Mysore (IN)

(73) Assignee: National Instruments Corporation, Austin, TX (US)

(*) Notice: Subject to any disclaimer, the term of this patent is extended or adjusted under 35 U.S.C. 154(b) by 1229 days.

(21) Appl. No.: 11/774,651

(22) Filed: Jul. 9, 2007

(65) Prior Publication Data

US 2009/0019453 A1    Jan. 15, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........................................... 719/312

(58) Field of Classification Search
USPC ........................................... 719/312
See application file for complete search history.

(56) References Cited

U.S. PATENT DOCUMENTS

| | | | |
|---|---|---|---|
| 4,953,106 A | 8/1990 | Gansner et al. | |
| 5,278,951 A * | 1/1994 | Camacho et al. | 345/440 |
| 5,475,851 A | 12/1995 | Kodosky et al. | |
| 5,481,740 A | 1/1996 | Kodosky | |
| 5,481,741 A | 1/1996 | McKaskle et al. | |
| 5,838,317 A * | 11/1998 | Bolnick et al. | 715/764 |
| 6,774,899 B1 * | 8/2004 | Ryall et al. | 345/440 |
| 7,062,718 B2 | 6/2006 | Kodosky et al. | |
| 2002/0154117 A1 * | 10/2002 | Saitou | 345/440 |
| 2005/0257203 A1 * | 11/2005 | Nattinger | 717/154 |
| 2008/0034292 A1 * | 2/2008 | Brunner et al. | 715/700 |
| 2008/0052617 A1 * | 2/2008 | Guido et al. | 715/246 |

OTHER PUBLICATIONS

K. Sugiyama, S. Tagawa, M. Toda: "Methods for Visual Understanding of Hierarchical System Structures"; IEEE Transactions on Systems, Man, and Cybernetics; vol. SMC-11; No. 2; pp. 109-125; Feb. 1981.

E. R. Gansner, E. Koutsofios, S. C. North, K. P. Vo: "A Technique for Drawing Directed Graphs"; IEEE Transactions on Software Engineering; vol. 19, No. 3, pp. 214-230; Mar. 1993.

* cited by examiner

*Primary Examiner* — Andy Ho
*Assistant Examiner* — Timothy A Mudrick
(74) *Attorney, Agent, or Firm* — Meyertons Hood Kivlin Kowert & Goetzel, P.C.; Jeffrey C. Hood; Jason L. Burgess

(57) ABSTRACT

Various embodiments of a system and method for automatically arranging or positioning objects in a block diagram of a graphical program are described. A graphical programming development environment or other software application may be operable to automatically analyze a block diagram of a graphical program, e.g., in order to determine objects present in the block diagram, as well as their initial positions within the block diagram. The graphical programming development environment may then automatically re-position various ones of the objects in the block diagram. In various embodiments, the objects may be re-positioned so as to better organize the block diagram or enable a user to more easily view or understand the block diagram.

27 Claims, 38 Drawing Sheets

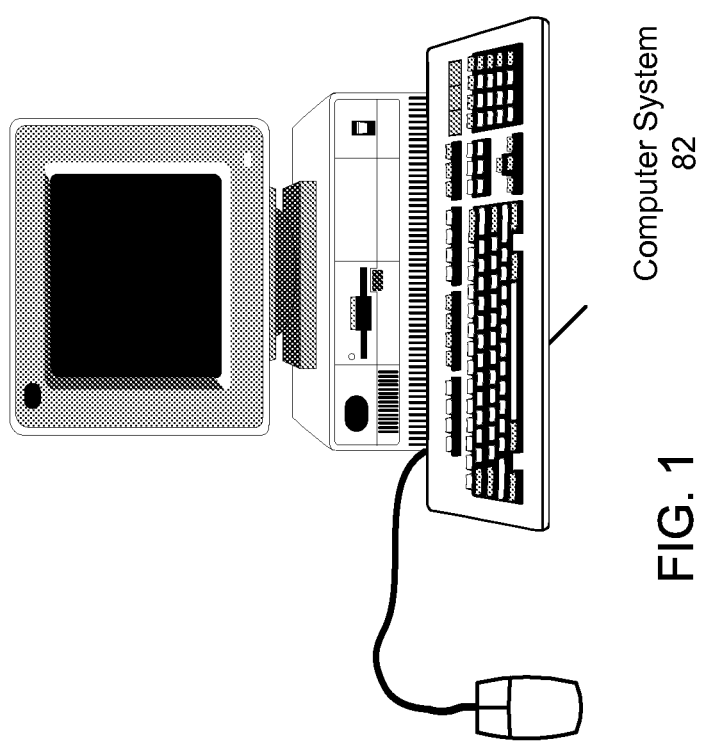

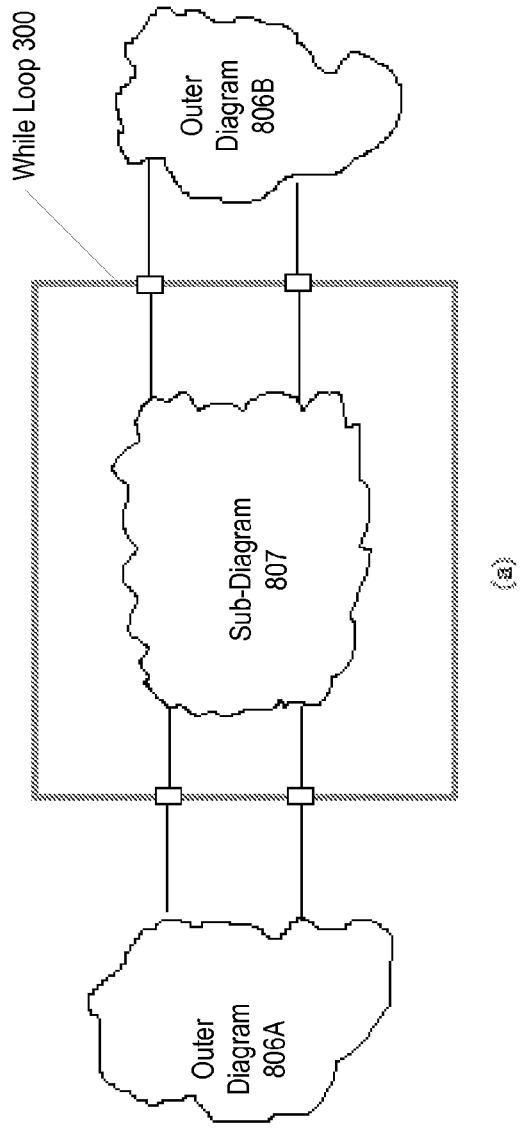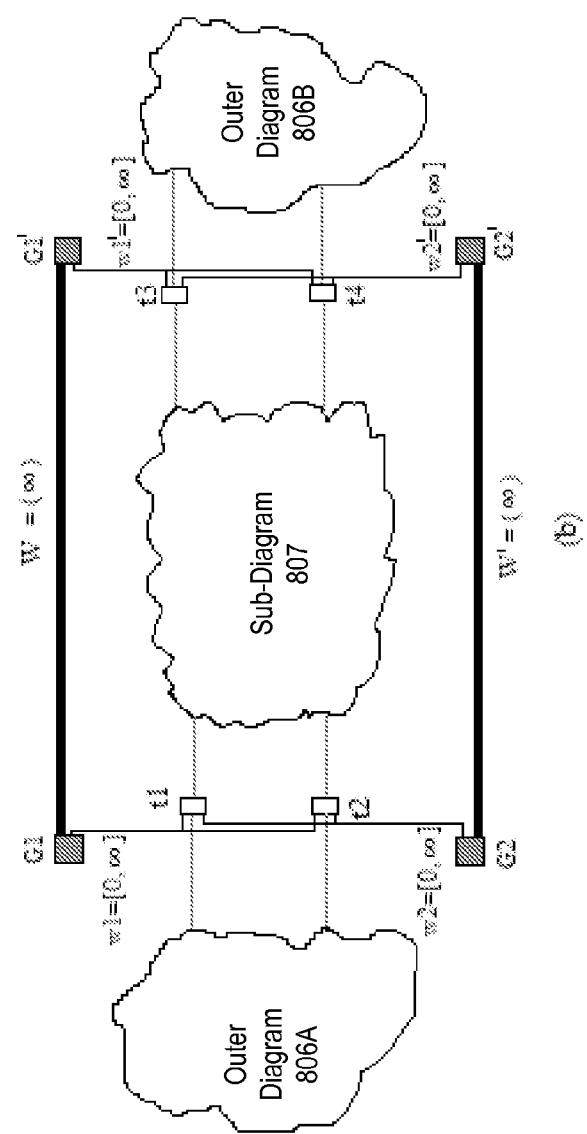
FIG. 25

AUTOMATICALLY ARRANGING OBJECTS IN A GRAPHICAL PROGRAM BLOCK DIAGRAM

FIELD OF THE INVENTION

The present invention relates to the field of graphical programming, and more particularly to a system and method for automatically arranging or positioning objects in a block diagram of a graphical program.

DESCRIPTION OF THE RELATED ART

Traditionally, text-based programming languages have been used by programmers in writing application programs. Many different text-based programming languages exist, including BASIC, C, C++, Visual C++, Java, FORTRAN, Pascal, COBOL, ADA, APL, etc. Increasingly, computers are required to be used and programmed by those who are not highly trained in computer programming techniques. When traditional text-based programming languages are used, the user's programming skills and ability to interact with the computer system often become a limiting factor in the user's efficiency of creating a computer program.

Graphical programming development environments that enable a user to create a program in a graphical manner without necessarily writing source code in a text-based programming language have been developed. Graphical programming development environments enable a user to create a software program by including a plurality of nodes or icons in a block diagram and interconnecting the nodes or icons, e.g., such that the interconnected plurality of nodes or icons visually indicates functionality of the resulting software program (called a "graphical program"). The resulting interconnected nodes may visually indicate a function or process performed by the graphical program during its execution.

Graphical programming has become a powerful tool available to programmers. Graphical programming development environments such as National Instruments Corp.'s LabVIEW product have become very popular. Tools such as LabVIEW have greatly increased the productivity of programmers, and increasing numbers of programmers are using graphical programming development environments to develop their software applications. In particular, graphical programming tools are being used for applications such as test and measurement, data acquisition, process control, man machine interface (MMI), supervisory control and data acquisition (SCADA) applications, modeling, simulation, image processing/machine vision applications, and motion control, among others.

SUMMARY OF THE INVENTION

Various embodiments of a system and method for automatically arranging or positioning objects in a block diagram of a graphical program are described. A graphical programming development environment or other software application may be operable to automatically analyze a block diagram of a graphical program, e.g., in order to determine objects present in the block diagram, as well as their initial positions within the block diagram. The graphical programming development environment may then automatically re-position various ones of the objects in the block diagram. In various embodiments, the objects may be re-positioned so as to better organize the block diagram or enable a user to more easily view or understand the block diagram.

BRIEF DESCRIPTION OF THE DRAWINGS

A better understanding of the present invention can be obtained when the following detailed description of the preferred embodiment is considered in conjunction with the following drawings, in which:

FIG. 1 illustrates an example of a computer system that may execute a graphical programming development environment application that implements the automatic arrangement of objects in a graphical program block diagram;

FIG. 25 illustrates an example graphical program which includes a while loop with a border which encloses a sub-diagram and illustrates the addition of guard blocks and constraints by the block diagram organization algorithm;

Figure 2A:
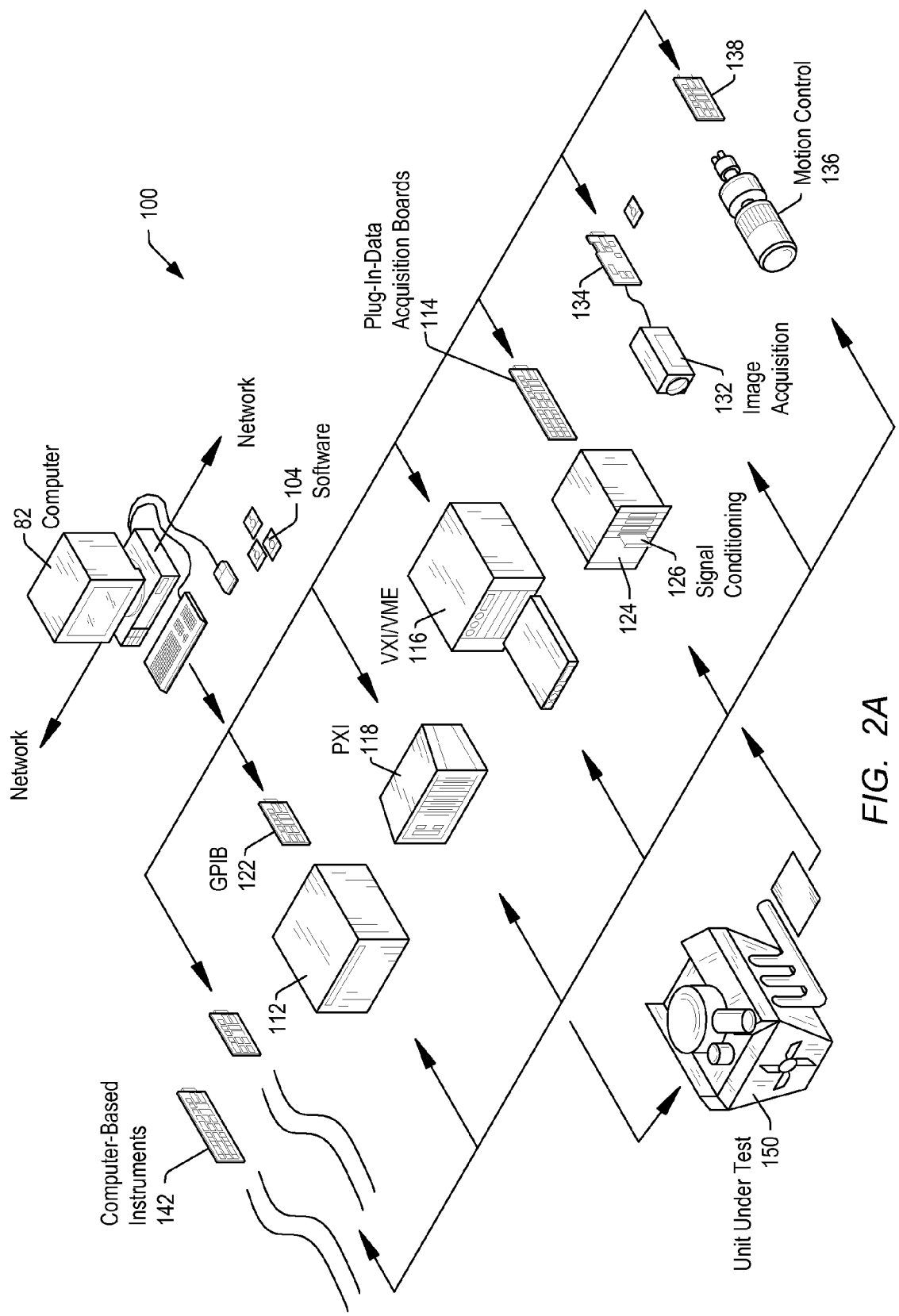
FIG. 2A illustrates an exemplary instrumentation control system 100.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. Patent Application Publication No. 20050268173 (Ser. No. 10/843,107) titled "Programmatically Analyzing a Graphical Program by Traversing Objects in the Graphical Program," filed May 11, 2004.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected blocks or icons, wherein the plurality of interconnected blocks or icons visually indicate functionality of the program.

The following provides examples of various aspects of graphical programs. The following examples and discussion are not intended to limit the above definition of graphical program, but rather provide examples of what the term "graphical program" encompasses:

The blocks in a graphical program may be connected in one or more of a data flow, control flow, and/or execution flow format. The blocks may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT• from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks are often referred to as the block diagram portion of the graphical program.

Block—In the context of a graphical program, an element that may be included in a graphical program. A block may have an associated icon that represents the block in the graphical program, as well as underlying code or data that implements functionality of the block. Exemplary blocks include function blocks, sub-program blocks, terminal blocks, structure blocks, etc. Blocks may be connected together in a graphical program by connection icons or wires.

The blocks in a graphical program may also be referred to as graphical program nodes or simply nodes.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between the icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics.

Wires may indicate communication of data, timing information, status information, control information, and/or other information between icons. In some embodiments, wires may have different visual appearances which may indicate different characteristics of the wire (e.g., type of data exchange semantics, data transfer protocols, data transfer mediums, and/or type of information passed between the icons, among others).

Graphical Data Flow Program (or Graphical Data Flow Diagram or Data Flow Diagram)—A graphical program or diagram comprising a plurality of interconnected blocks, wherein at least a subset of the connections among the blocks visually indicate that data produced by one block is used by another block. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Various embodiments of a system and method for automatically arranging or positioning objects in a block diagram of a graphical program are described herein. As described in detail below, a graphical programming development environment or other software application may be operable to automatically analyze a block diagram of a graphical program, e.g., in order to determine objects present in the block diagram, as well as their initial positions within the block diagram. The software application may then automatically re-position various ones of the objects in the block diagram. In various embodiments, the objects may be re-positioned so as to better organize the block diagram or enable a user to more easily view or understand the block diagram.

In various embodiments, any kind of software application may implement the automatic arrangement/re-positioning of the objects in the graphical program block diagram. For example, in some embodiments, a graphical programming development environment (e.g., a software application that enables users to develop graphical programs) may implement the automatic arrangement of the objects.

FIG. 1 illustrates an example of a computer system 82 that may execute the graphical programming development environment application (or other software application) that implements the automatic arrangement of objects in a graphical program block diagram. The computer system 82 may include at least one memory medium on which various computer programs, software components, and data structures are stored. In particular, the memory medium may store the graphical programming development environment application, which may be executed by one or more processors of the computer system 82. The memory medium may also store a graphical program. The memory medium may also store operating system software, as well as other software for operation of the computer system.

As described below, the graphical programming development environment may be operable to automatically arrange or position objects within a block diagram of the graphical program. For example, in some embodiments the graphical programming development environment may automatically arrange the objects in the block diagram in response to a user request for the graphical programming development environment to organize the block diagram.

As shown in FIG. 1, the computer system 82 may also include a display device. The block diagram of the graphical program may be displayed on the display device. For example, a plurality of nodes interconnected by lines or wires may be displayed in the block diagram. The plurality of interconnected nodes may visually indicate functionality of the graphical program. After the graphical programming development environment has automatically arranged or re-positioned the objects in the block diagram, the block diagram may appear differently in the display device. For example, one or more of the objects in the block diagram may be located at different positions than where they were initially.

Exemplary Systems

In various embodiments, the graphical program whose block diagram objects are automatically arranged according to the method described herein may be a graphical program operable to perform any of various kinds of functions or associated with any of various kinds of application. For example, in various embodiments the graphical program may perform functions such as test and/or measurement functions; controlling and/or modeling instrumentation or industrial automation hardware; modeling and simulation functions, e.g., modeling or simulating a device or product being developed or tested, etc. Other exemplary test applications where the graphical program may be used include hardware-in-the-loop testing and rapid control prototyping, among others.

However, it is noted that in other embodiments the graphical program may be used for any other type of application and is not limited to the above applications. For example, the graphical program may perform a function such as the control of other types of devices such as multimedia devices, video devices, audio devices, telephony devices, Internet devices, etc., as well as general purpose software applications such as word processing, spreadsheets, network control, network monitoring, financial applications, games, etc.

FIG. 2A illustrates an exemplary instrumentation control system 100. The system 100 comprises a host computer 82 which couples to one or more instruments. The host computer 82 may comprise a CPU, a display screen, memory, and one or more input devices such as a mouse or keyboard as shown. In some embodiments the computer 82 may execute the graphical program, where the graphical program operates with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. In various embodiments the graphical program may be used in a data acquisition and control application, a test and measurement application, an image processing or machine vision application, a process control application, a man-machine interface application, a simulation application, or a hardware-in-the-loop validation application, among others.

Figure 2B:
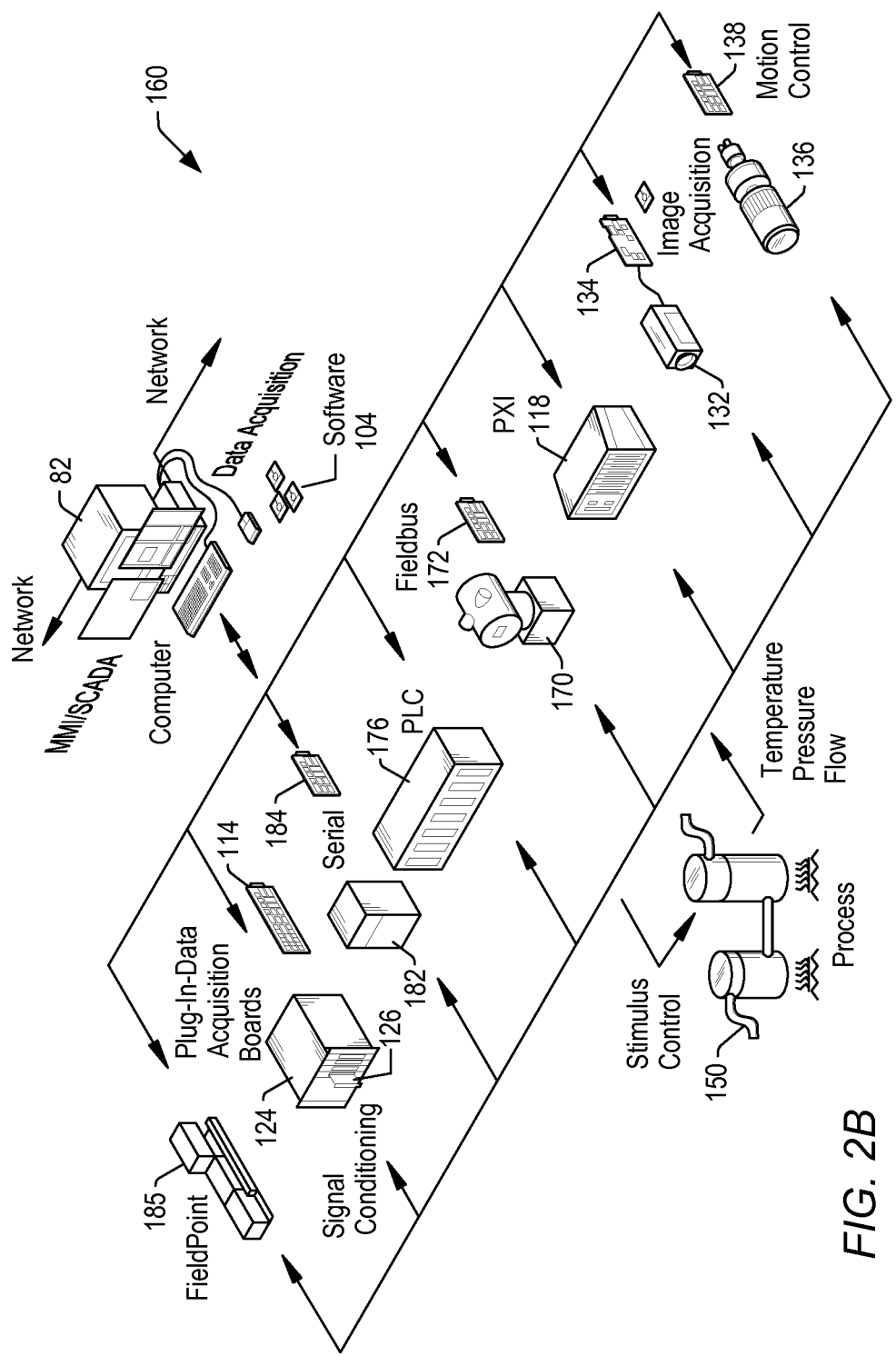
FIG. 2B illustrates an exemplary industrial automation system 160.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. In some embodiments the computer 82 may execute the graphical program, where the graphical program operates with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices. In some embodiments of the systems of FIGS. 2A and 2B, one or more of the various devices may couple to each other over a network, such as the Internet.

Graphical programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 3:
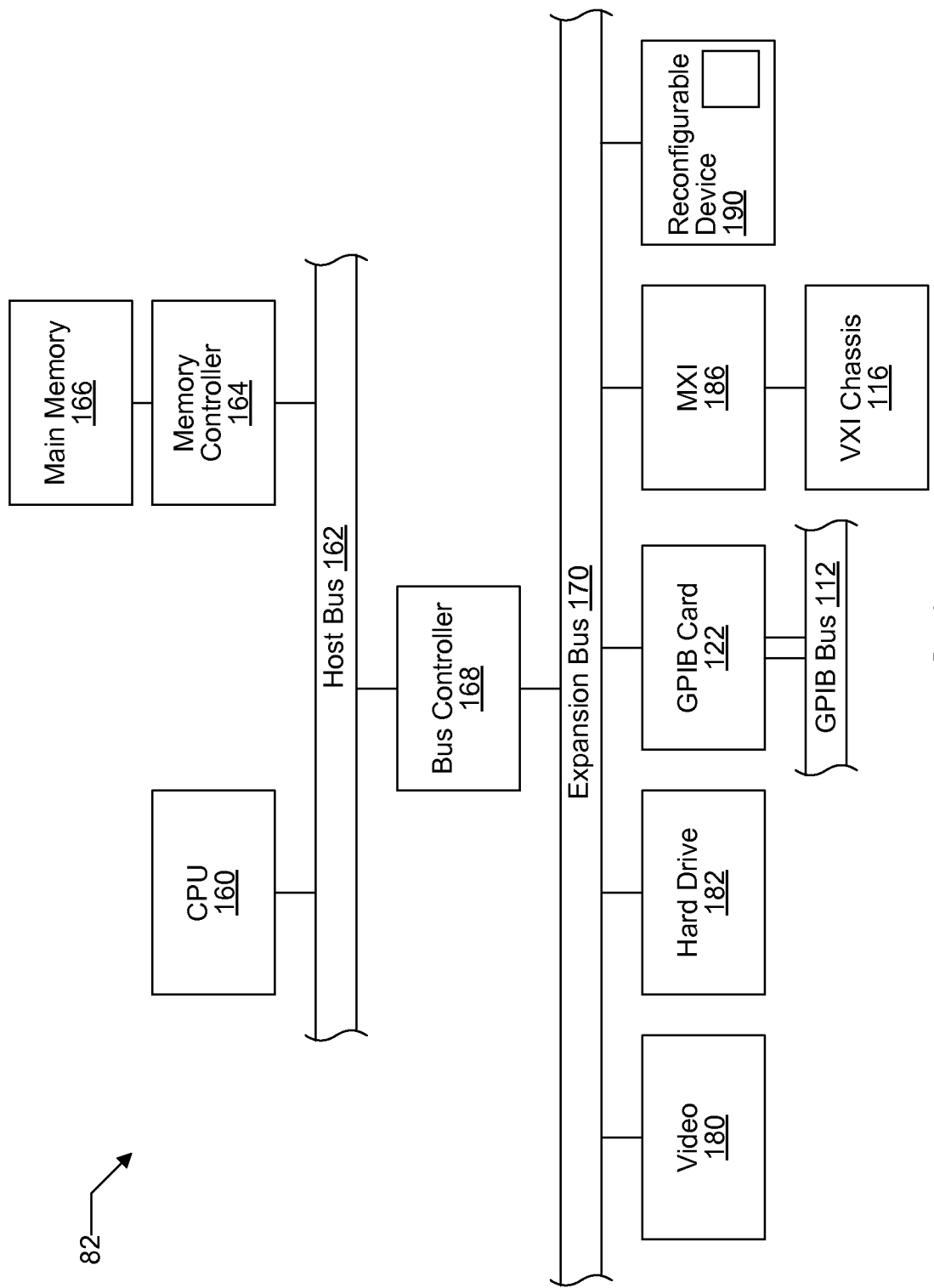
FIG. 3 is a block diagram representing one embodiment of the computer system illustrated in FIGS. 1, 2A, and 2B.

FIG. 3 is a block diagram representing one embodiment of the computer system 82 illustrated in FIGS. 1, 2A, and 2B. It is noted that any type of computer system configuration or architecture can be used as desired, and FIG. 3 illustrates a representative PC embodiment. It is also noted that the computer system may be a general purpose computer system, a computer implemented on a card installed in a chassis, or other types of configurations. Elements of a computer not necessary to understand the present description have been omitted for simplicity.

In this example, the computer system 82 may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory 166, is coupled to the host bus 162 by means of memory controller 164.

The main memory 166 may store the graphical programming development environment and the graphical program, where the graphical programming development environment operates to automatically arrange the objects in the block diagram of the graphical program according to the method described below.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. In some embodiments the computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 4:
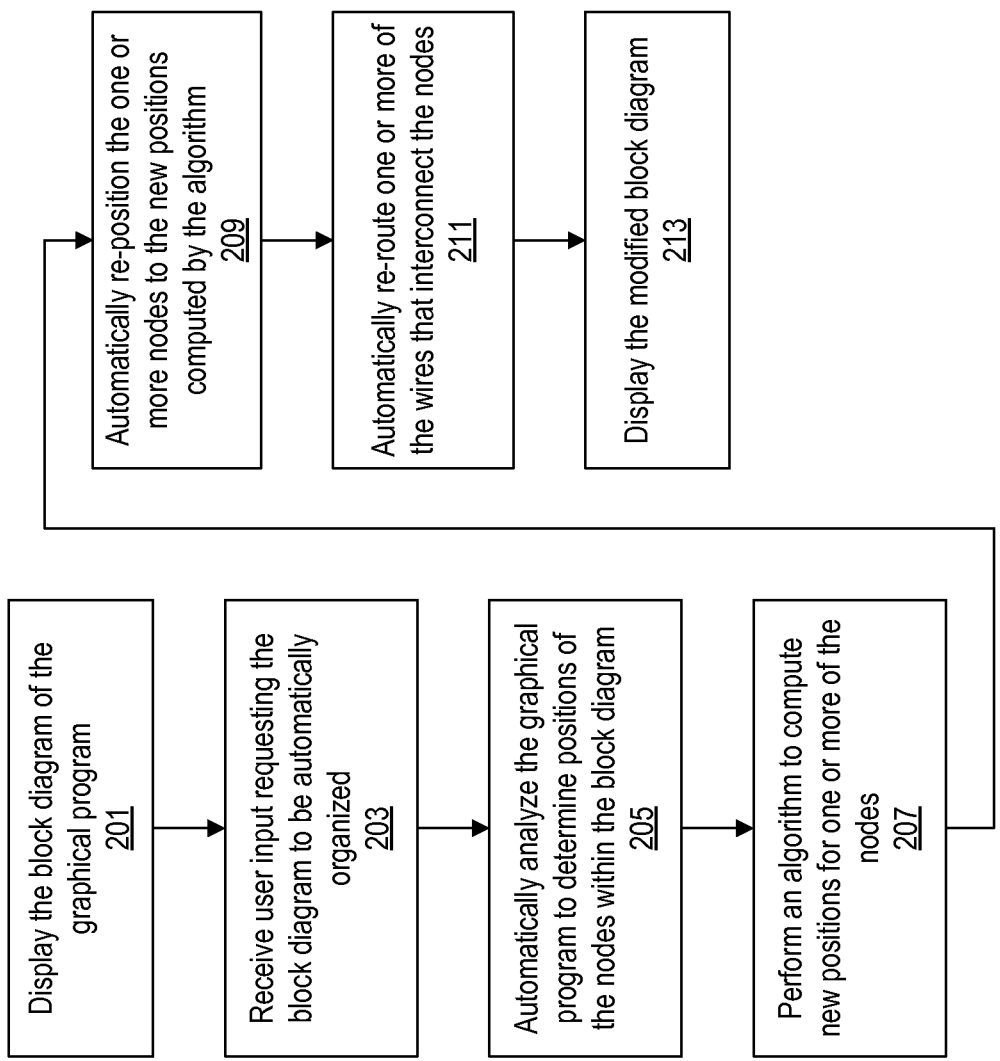
FIG. 4 is a flowchart diagram illustrating one embodiment of a method for automatically organizing a block diagram of a graphical program.

FIG. 4 is a flowchart diagram illustrating one embodiment of a method for automatically organizing a block diagram of a graphical program. The method of FIG. 4 may be implemented by the graphical programming development environment.

As indicated in 201, the block diagram of the graphical program may be displayed, e.g., on the display of the computer 82. For example, the block diagram may display various nodes which the user has included in the graphical program, as well as wires the user has created to connect the nodes.

For various reasons, the block diagram of the graphical program may not be organized particularly well. For example, as the user creates the graphical program, the user does not always know exactly which nodes will be present in the block diagram and how these nodes will be positioned when the graphical program is complete, since creating the graphical program may be something of an experimental or iterative process. Thus, for example, the user may find that he needs to insert a node in a place where he originally did not anticipate a node being located. Even if the user does know exactly which nodes will be present in the completed program, the user still may not want to take the time to align and space the nodes with respect to each other in order to form an aesthetically pleasing block diagram.

Thus, the graphical programming development environment may be operable to automatically organize the block diagram for the user. For example, as shown in 203, the graphical programming development environment may receive user input requesting the block diagram to be automatically organized. For example, the user may select a menu item or provide other input to request the graphical programming development environment to automatically organize the block diagram.

In response, the graphical programming development environment may automatically analyze the graphical program to determine positions of the nodes within the block diagram, as indicated in 205. For example, the graphical programming development environment may traverse data structures representing the graphical program to determine which nodes and other objects are present, determine how these nodes are connected to each other, determine the original positions of the nodes (e.g., where they are originally located in the block diagram), etc.

In 207, the graphical programming development environment may perform an algorithm to compute new positions for one or more of the nodes, e.g., based on the information obtained when the graphical program is analyzed in 205. In various embodiments the graphical programming development environment may use any kind of algorithm to compute the new positions. Exemplary algorithms are described below.

In 209 the graphical programming development environment may automatically re-position the one or more nodes to the new positions computed by the algorithm. Thus, the nodes may be re-positioned or rearranged within the block diagram without the user providing input to manually move the nodes. Also, as indicated in 211, one or more of the wires that interconnect the nodes may be automatically re-routed, e.g., to reflect the new positions of the nodes.

As indicated in 213, the graphical programming development environment may display the modified block diagram. In some embodiments the window which displays the original block diagram may be updated after the objects in the block diagram have been re-positioned, e.g., so that the modified block diagram replaces the original block diagram. In other embodiments the modified block diagram may be displayed in a new window.

In other embodiments the modified block diagram may not be immediately displayed all at once. Instead the graphical programming development environment may be operable to display animations so that the user can see how objects in the graphical program have been re-positioned. For example, where a node is re-positioned to a new location, the graphical programming development environment may display an animation of the node moving from its original location to the new location.

In various embodiments the block diagram organization algorithm may re-position nodes in the graphical program in order to achieve any of various goals and according to any of various constraints. The nodes are preferably re-positioned and the wires are preferably routed in such a way that an aesthetically pleasing block diagram that is easy for the user to view and understand is achieved. For example, nodes may be aligned with each other in various ways. Also, nodes may be distributed so that there is sufficient space between them, but yet so that space is not wasted, and the resulting block diagram is compact so that the user can view a lot of information at once. Wires may be routed so that the number of wire crossings is minimized, and wire bends are positioned in such a way that the diagram does not appear cluttered.

In some embodiments the graphical program may be a graphical data flow program, e.g., a graphical program which visually indicates data flow among the nodes. For example, a wire between two nodes may indicate that output data produced by one node is passed as input data to the other node. In some embodiments the block diagram may be automatically organized so that left-to-right data flow semantics is obeyed. For example, if one node produces data that is passed as input to another node, the first node may be positioned to the left of the second node. Thus, it may be easily seen that data flows from left to right along each wire in the block diagram.

Figure 5:
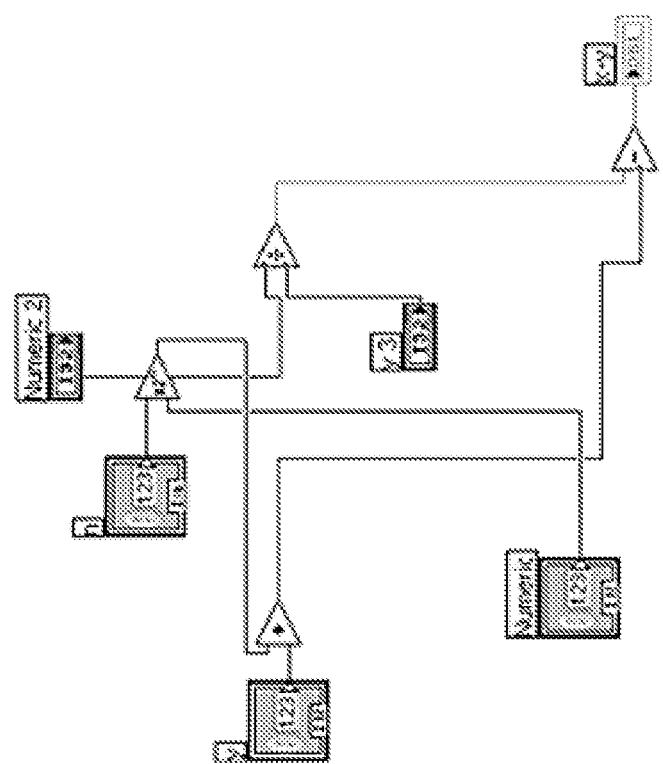
FIG. 5 illustrates an example of a graphical program block diagram before it has been automatically organized by the graphical programming development environment.
Figure 6:
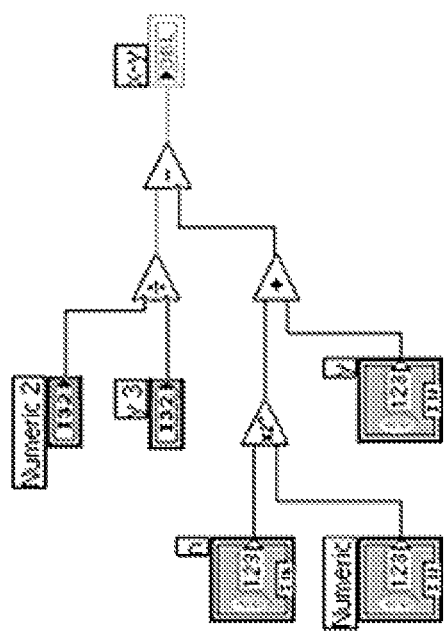
FIG. 6 illustrates an example of how the block diagram of FIG. 5 may appear after it has been automatically organized by the graphical programming development environment according to one embodiment.

FIG. 5 illustrates an example of a graphical program block diagram before it has been automatically organized by the graphical programming development environment. FIG. 6 illustrates an example of how the block diagram of FIG. 5 may appear after it has been automatically organized by the graphical programming development environment according to one embodiment. It is noted that FIG. 6 illustrates one example of how the block diagram may be automatically re-organized, and in various other embodiments the resulting block diagram may differ in appearance.

Figure 7:
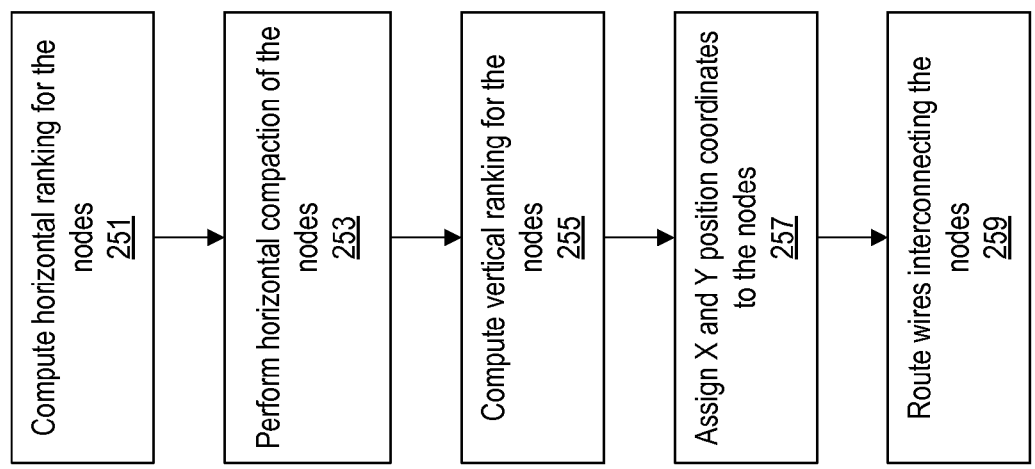
FIG. 7 is a flowchart diagram illustrating one embodiment of an algorithm for automatically computing the new positions of the nodes in the block diagram of the graphical program.

FIG. 7 is a flowchart diagram illustrating one embodiment of an algorithm for automatically computing the new positions of the nodes in the block diagram of the graphical program, e.g., block 207 of FIG. 4. It is noted that FIG.7 represents one example of an algorithm, and in alternative embodiments any of various other algorithms may be used.

In 251, a horizontal ranking for the nodes may be computed. The block diagram may be divided horizontally into a plurality of columns or "ranks". When the algorithm is complete, each node may be horizontally positioned in one of the ranks. In 251, each node may be assigned an X-rank which indicates its relative horizontal positioning. For example, an X-rank of 1 indicates that a node is positioned in the left-most horizontal rank, an X-rank of 2 indicates that a node is positioned in the next rightward horizontal rank, etc.

In various embodiments, any of various algorithms may be used to assign the X-ranks to the nodes. The nodes are preferably assigned X-ranks in such a way that left-to-right data flow semantics is enforced. In one embodiment an X-rank is given to each node with the following rule:

$$\rho_x(v_j) = \max(\rho_x(v_i)) + 1 \text{ for each edge } e = (v_i, v_j) \text{—The algorithm may begin with } \rho_x(v_{0 \ldots n}) = 0$$

Thus, for a given node v=hd j=1, the X-rank of the node $v_j$ is 1 more than the maximum X-rank of all nodes incident on the node $v_j$.

Figure 8:
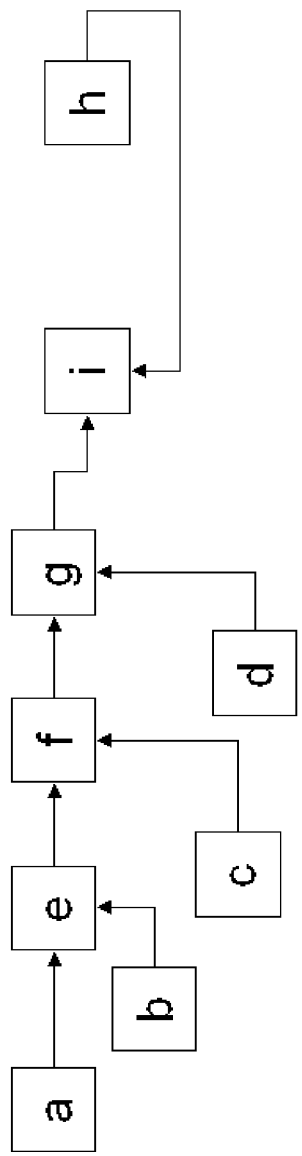
FIG. 8 illustrates an example of a block diagram before the nodes have been horizontally ranked.
Figure 9:
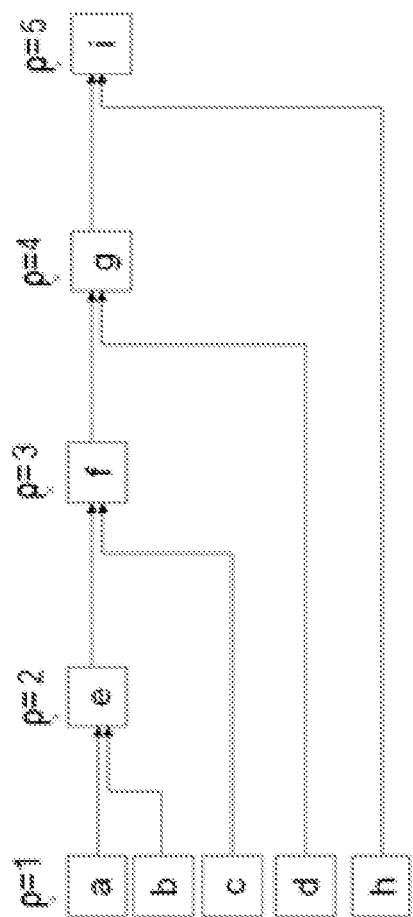
FIG. 9 illustrates how X-ranks may be assigned to the nodes.

FIG. 8 illustrates an example of a block diagram before the nodes have been horizontally ranked. FIG. 9 illustrates how X-ranks may be assigned to the nodes according to the rule given above. As shown, the nodes a, b, c, d, and h have been assigned an X-rank of 1, indicating that these nodes are in the left-most rank. Node e has been assigned an X-rank of 2, indicating that this node is in the next rank. Similarly, node f has been assigned an X-rank of 3, node g has been assigned an X-rank of 4, and node i has been assigned an X-rank of 5.

In 253, horizontal compaction of the nodes may be performed, which may change the X-ranks of the nodes. The compaction may be performed in order to reduce the lengths of the wires that connect the nodes. For example, the nodes may be positioned in X-ranks so that they are as close to each other as they can be while still obeying left-to-right data flow semantics. In some embodiments a network simplex algorithm may be used to perform the horizontal compaction. As discussed below, in some embodiments the simplex algorithm may be modified to handle complex nodes, such as structure nodes that have a sub-diagram.

Figure 10:
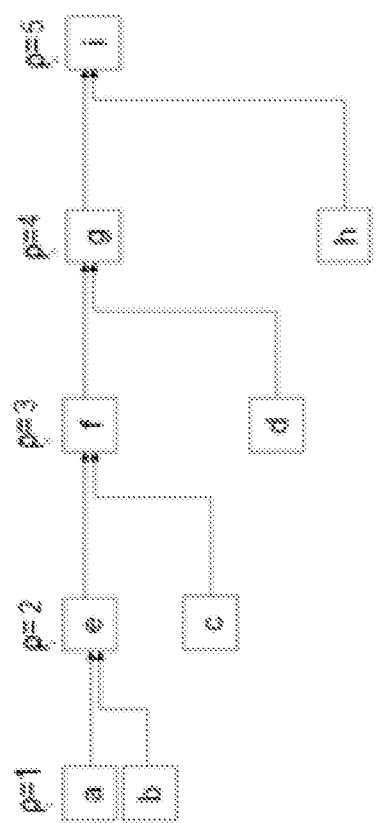
FIG. 10 illustrates the example of FIGS. 8 and 9 after horizontal compaction has been performed.

FIG. 10 illustrates the example of FIGS. 8 and 9 after the horizontal compaction has been performed. As shown, node c has been moved to X-rank number 2, node d has been moved to X-rank number 3, and node h has been moved to X-rank number 4.

Figure 11:
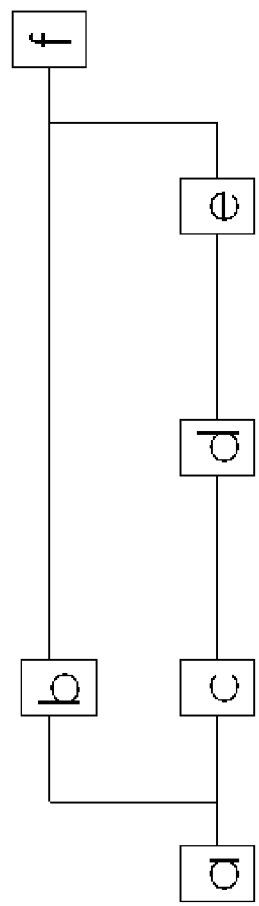
FIG. 11 illustrates an example of a block diagram in which the lengths of one or more wires after compaction are longer than one X-rank.
Figure 12:
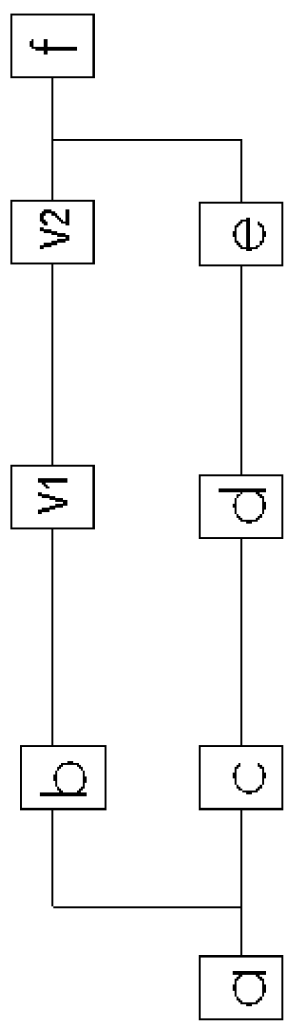
FIG. 12 illustrates the example of FIG. 11, where two virtual placeholder nodes have been inserted to reduce all wire lengths to one X-rank.

In some block diagrams, the lengths of one or more wires after compaction may be longer than one X-rank, e.g., as illustrated in the example of FIG. 11. As shown, the wire connecting nodes b and f is longer than one X-rank. In some embodiments the algorithm may insert virtual placeholder nodes so that each wire is only one X-rank in horizontal length. For example, FIG. 12 illustrates the example of FIG. 11, where two virtual placeholder nodes v1 and v2 have been inserted between nodes b and f. The use of virtual placeholder nodes may simplify remaining steps of the algorithm, e.g., may simply the wire routing. The virtual placeholder nodes may be removed when the algorithm is complete. Thus, the nodes are simply used internally by the algorithm and do not permanently alter the graphical program and are not displayed to the user.

In 255, a vertical ranking for the nodes may be computed, similar to the horizontal ranking. When the algorithm is complete, each node may be vertically positioned in one of the vertical ranks. For example, each node may be assigned a Y-rank which indicates its relative vertical positioning. For example, an Y-rank of 1 indicates that a node is positioned in the top-most vertical rank, a Y-rank of 2 indicates that a node is positioned in the next lower vertical rank, etc.

Figure 13:
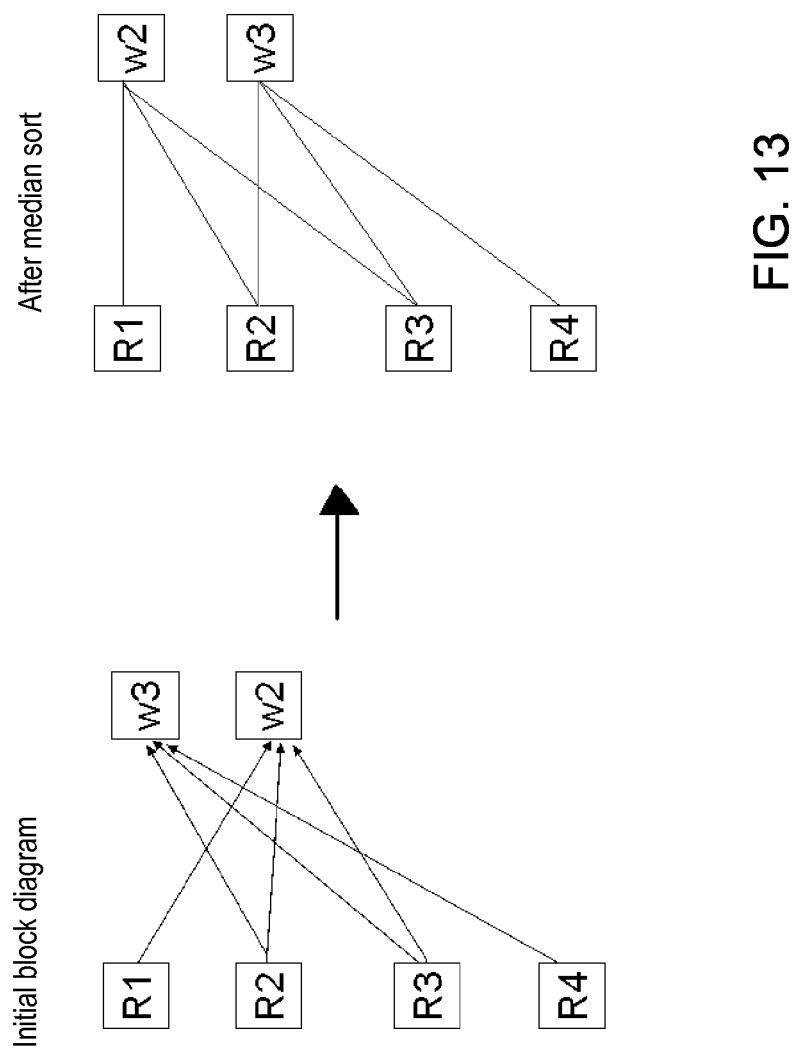
FIG. 13 illustrates an example of a block diagram before and after a median sort has been performed.

In various embodiments, any algorithm may be used to compute the vertical ranking for the nodes. In one embodiment a median sort may first be performed. For example, the left side of FIG. 13 illustrates an example of a block diagram before the median sort is performed. The right side of FIG. 13 illustrates the block diagram after the median sort. As shown, nodes w2 and w3 have been swapped vertically with respect to each other. In some embodiments a local transposition algorithm may be performed after the median sort.

The vertical ranking algorithm described above attempts to minimize the total number of wire crossings in the block diagram by looking at each pair of adjacent X-ranks and minimizing the number of crossings in the adjacent X-ranks. Thus, the algorithm does not look beyond one X-rank. In other embodiments the vertical ranking algorithm may be modified so that it looks further ahead beyond one X-rank. For example, the vertical ordering that produces minimal wire crossings for one stage may cause more wire crossings in another stage. Thus, in some embodiments the algorithm may not necessarily minimize the crossings at every stage but may look ahead in order to determine the best ordering that produces the fewest overall number of wire crossings.

Thus, after the horizontal and vertical ranking of the nodes has been performed, the relative horizontal and vertical positioning of the nodes is known. In 257, the actual X and Y position coordinates may be assigned to the nodes.

All the blocks of a given X-rank may be assigned the same X coordinate. The X coordinates may then be adjusted depending on the type of alignment used. To ensure that enough space is provided to route the wires between adjacent X-ranks, the gap between adjacent X-ranks may be set as a function of the number of wires traveling between those two X-ranks.

Figure 14:
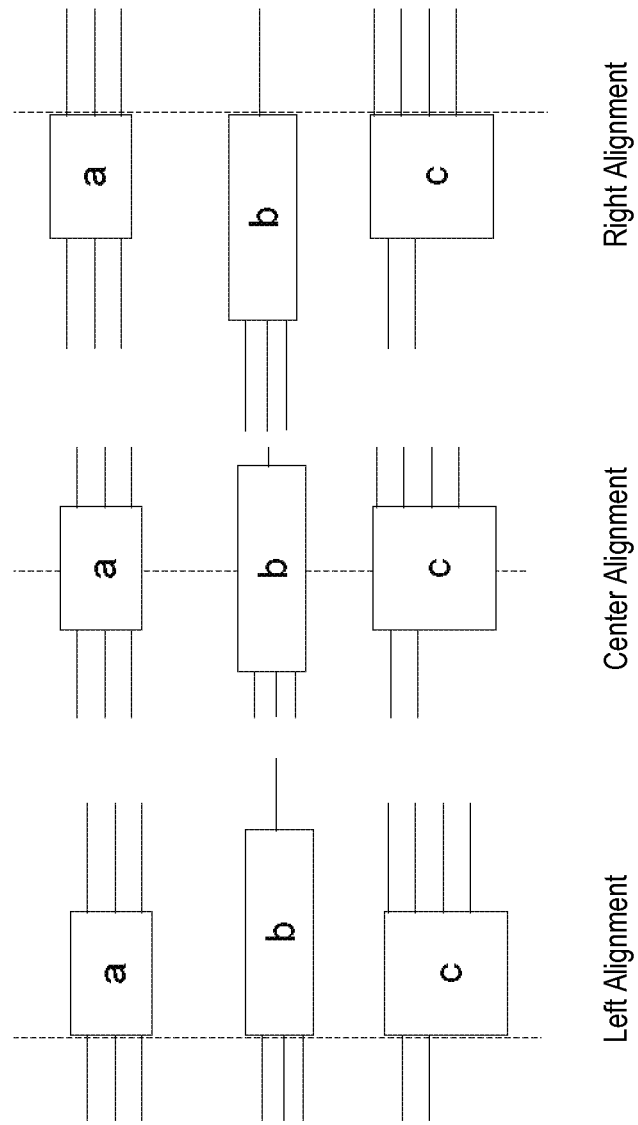
FIG. 14 illustrates 3 examples in which 3 nodes have been aligned using left alignment, center alignment, and right alignment.

Within each X-rank the nodes may be aligned with each other according to any desired alignment technique. For example, FIG. 14 illustrates 3 examples in which nodes a, b, and c have been aligned using left alignment, center alignment, and right alignment. To compute the alignment, the width of the widest node in the X-rank may be determined. That node will occupy the whole X-rank, and all other nodes are aligned with respect to that node. Thus, in left alignment, the left sides of the nodes are matched. In right alignment, the right sides of the nodes are matched. In center alignment, the centers of the nodes are matched.

Figure 15:
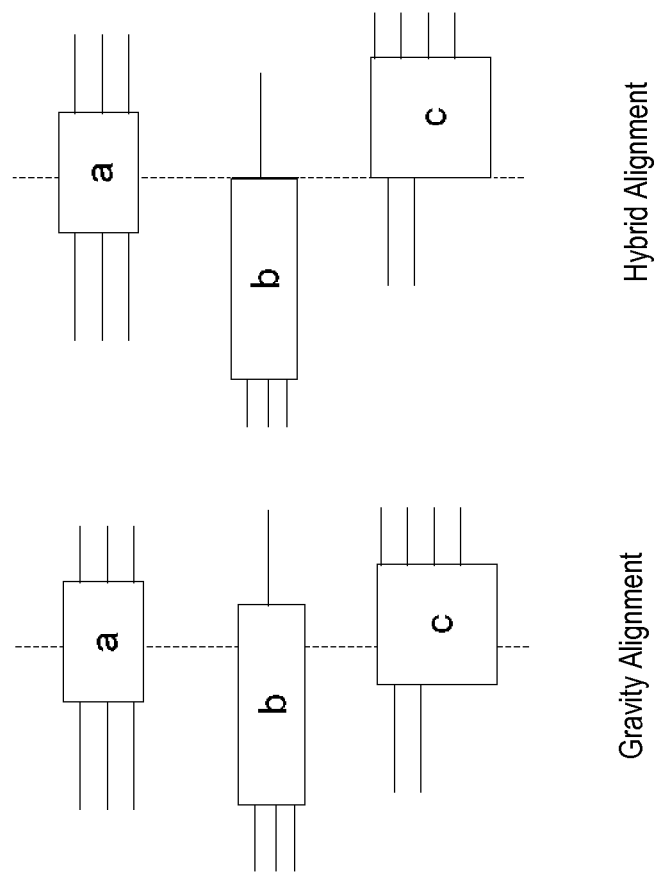
FIG. 15 illustrates two other examples of alignment techniques, referred to as gravity alignment and hybrid alignment.

FIG. 15 illustrates two other examples of alignment techniques, referred to as gravity alignment and hybrid alignment. These alignment techniques may result in a more natural staggered appearance, while still keeping the block diagram ordered. These alignment techniques may also help reduce the lengths of the wires. In the gravity alignment technique the X coordinates of the nodes may be set as follows:

The X coordinates will be $(x+\delta x)$, where x=the X coordinate that would be assigned when the blocks are aligned by left alignment; and $\delta x$=the gravity pull towards the destination. The gravity pull may be calculated as $f(w_i, w_o, \omega, W)$, where $w_i$=input wires; $w_o$=output wires; $\omega$=width of the node; W=width of the widest node in the rank; and $0 \leq \delta x \leq \omega$.

For the hybrid alignment technique, $\delta x$ is one of $\{0, (W-\omega)/2, W-\omega\}$.

Grouping numbers for each of the blocks may be used in determining the gravity. The closer the group matching, the higher the pull of the nodes. Thus, the nodes of similar groupings tend to remain closer.

When assigning Y coordinates to the nodes, the Y coordinates may be assigned so as to place connected blocks close to each other. This may keep the block diagram vertically compact and reduce the wire lengths. In some embodiments a network simplex algorithm may be used to assign the Y coordinates.

In 259, wires interconnecting the nodes may be routed. The wire routing may be determined relatively easily since no wire is longer than one X-rank because of the insertion of virtual placeholder nodes, as described above. Since the vertical ordering was calculated by taking the number of wire crossings into account, in some embodiments the wires can be routed with a minimal or near minimal number of crossings.

Figure 16:
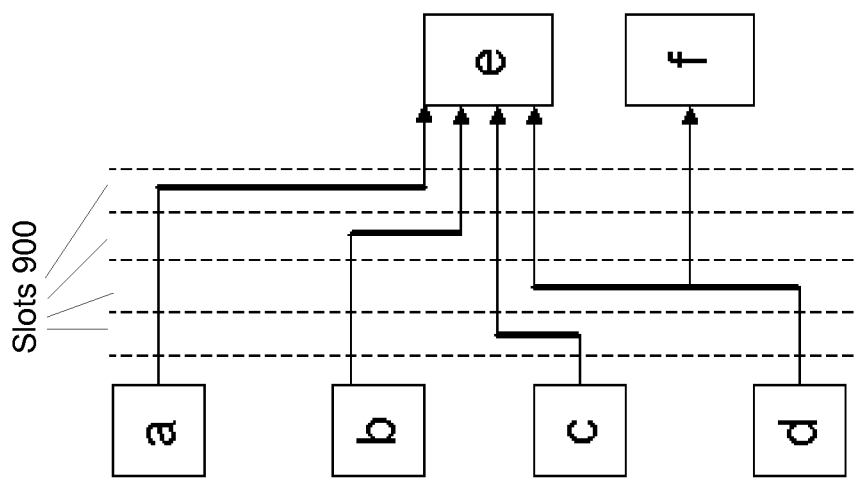
FIG. 16 illustrates an example in which the area between two X-ranks has been divided into 4 slots for wire routing.

In some embodiments wires may be routed by dividing the area between adjacent X-ranks into N vertical slots, where N is number of bend wires going between the two X-ranks. For example, FIG. 16 illustrates an example in which the area between two X-ranks has been divided into 4 slots 900, which are demarcated by the dashed vertical lines.

The wire-routing problem is assigning the vertical slots to each of the wires in a way such that they will not overlap and routed with minimum possible crossings. For example, in FIG. 16, the vertical part of each wire is assigned to one of the slots. The horizontal portions of the wires are not considered, as their space is already reserved (by the virtue of node size and vertical positioning.)

Each wire splits the area between the connected nodes into two halves. The algorithm routes the wires from top to bottom. The aim of the wire-routing algorithm is to maximize the area below the wire being routed. This will ensure the yet-to-be-routed wires have enough space so that it will not lead to unnecessary crossings.

Figure 17:
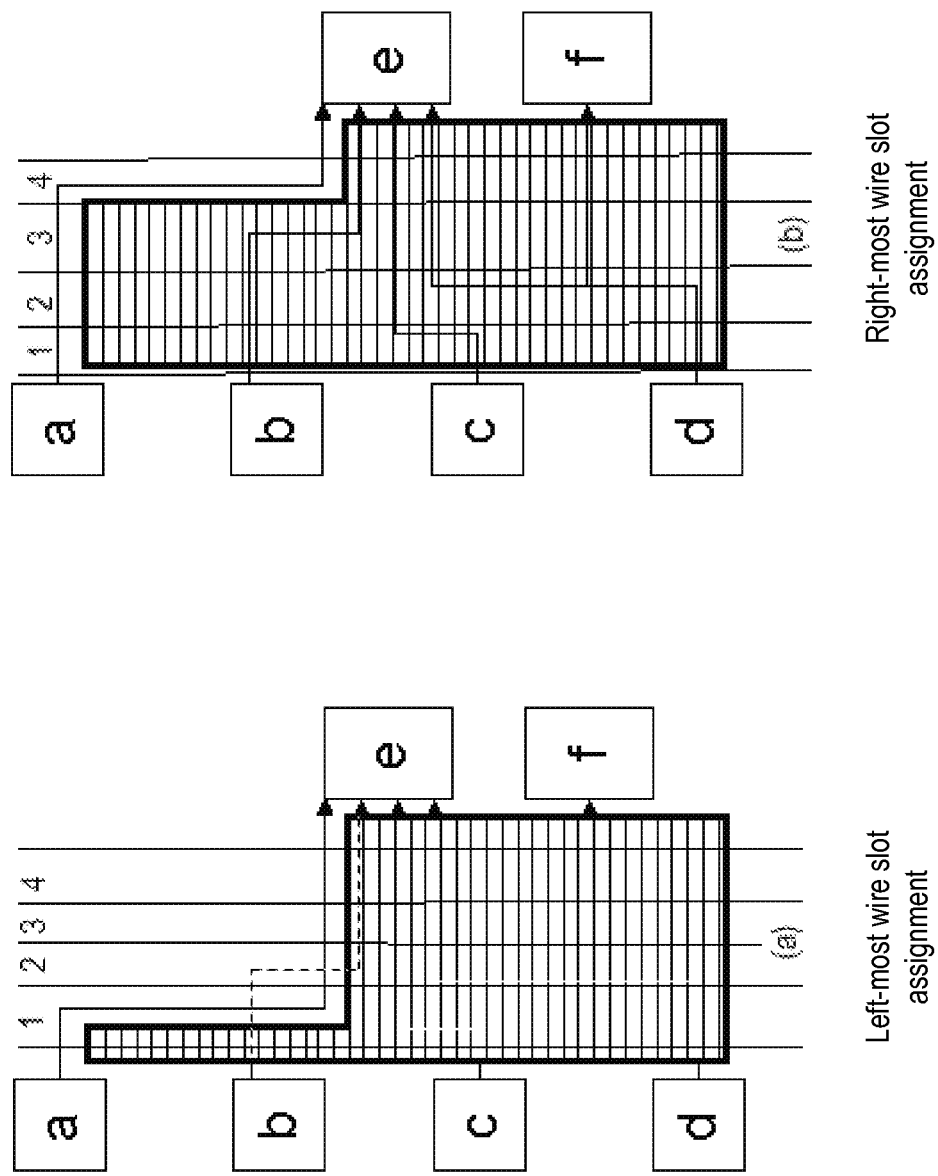
FIG. 17 shows two techniques for assigning a wire slot.

In FIG. 17, the wire connecting node a to node e (referred to as wire a-e) is the current wire being routed. FIG. 17 shows two techniques for assigning a wire slot. In the left side of FIG. 17, the wire a-e is assigned to the left-most slot, slot 1. In the right side of FIG. 17, the wire a-e is assigned to the right-most slot, slot 4. If the left-most slot is assigned to wire a-e, as indicated by the left side of FIG. 17, then the un-routed area (indicated as the shaded area) is reduced. In this case, when a slot for wire b-e is assigned, slot 1 cannot be re-used because this would end up overlapping wire b-e with wire a-e, which breaks the rule of the wire routing. Assigning any of the other slots to wire b-e would cause the wire b-e to cross the wire a-e.

Thus, instead of assigning wire a-e to the left-most slot, the wire a-e may be assigned to the right-most slot, slot 4, as indicated in the right side of FIG. 17. This maximizes the un-routed area (indicated as the shaded area). In this case the wire b-e can be safely assigned to any of the other slots without introducing any crossings.

Thus, to maximize the un-routed area, the downward wires are assigned the right-most slots. In a similar manner, the upward wires are assigned the left-most slots. As shown in FIG. 16, the wire from node d branches into both node e and node f. Until this point, the algorithm treats the branched wires, wire d-e and wire d-f as two different wires. While routing these branched wires, only the longest branch is routed and the remaining branches are placed over the already routed branch. In this example, only wire d-e is routed, and wire d-f is placed over wire d-e.

Figure 18:
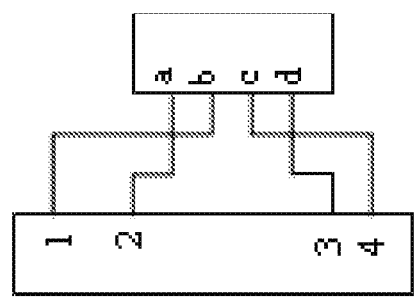
FIG. 18 illustrates an example in which 4 output terminals of a source node are connected to 4 input terminals of a destination node.

The order in which the wires are routed may affect the wire routing algorithm. The order of the wires is not decided by the wire but is decided by the terminals where the wires attach to the nodes. FIG. 18 illustrates an example in which 4 output terminals of a source node (terminals 1, 2, 3, 4) are connected to 4 input terminals (terminals a, b, c, d) of a destination node. In the example of FIG. 18, both wire 1-*b* and wire 2-*a* can be considered as the top wire depending on which terminal is considered. If the wires are picked in their source terminal's order then wire 1-*b* will be the first wire to get routed. If the wires are picked in their destination terminal's order then wire 2-*a* will be routed first.

The densities of the source and destination terminals (i.e., how close together the terminals are) may be used to decide which of these orders are picked. In FIG. 18, the destination terminals are more dense than the source terminals. The relative densities of the terminals may be considered so as to move the wire crossings away from the denser terminals and make the block diagram more visually pleasing.

Figure 19:
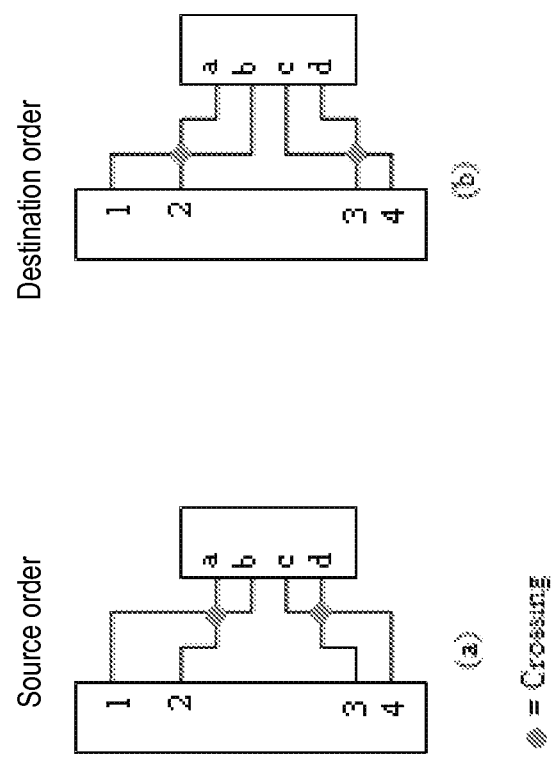
FIG. 19 illustrates an example in which the wires are routed in the order of the source terminals and in the order of the destination terminals, where the destination terminals are denser than the source terminals.

For example, the left side of FIG. 19 illustrates an example in which the wires are routed in the order of the source terminals. The right side of FIG. 19 illustrates an example in which the wires are routed in the order of the destination terminals. In this example, the destination terminals are denser than the source terminals. Routing the wires based on the source terminals (shown on the left side of FIG. 19) results in wire crossings closer to the destination node, which makes the area near the destination node look more cluttered. Thus, the wires may instead be routed in the order of the destination terminals (shown on the right side of FIG. 19), which results in wire crossings closer to the source and makes the diagram look less cluttered. Thus, choosing the routing order based on the order of the denser terminals ensures that the crossings are closer to the less dense terminals.

Figure 20:
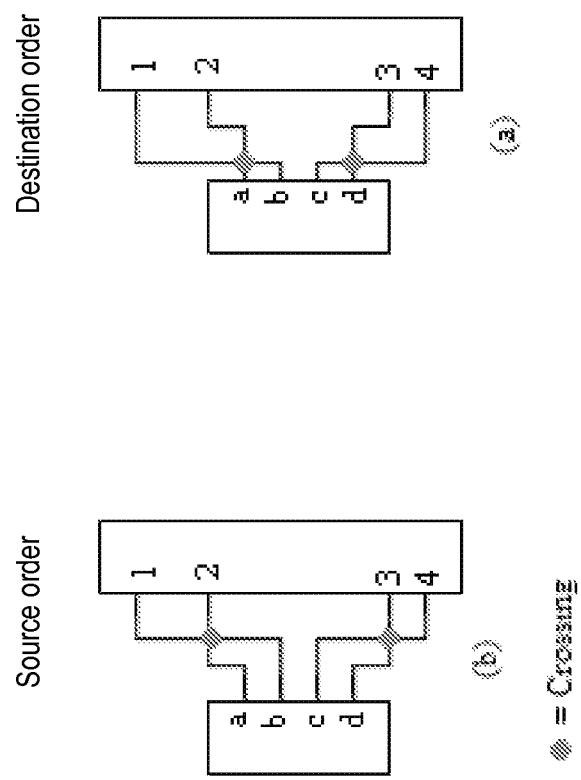
FIG. 20 illustrates a reverse situation where the source terminals are denser than the destination terminals.

In the example of FIG. 19 the destination terminals are denser (located closer to each other) than the source terminals. FIG. 20 illustrates a reverse situation where the source terminals are denser than the destination terminals. As shown, routing the wires in the order of the denser source terminals (shown on the left side of FIG. 20) results in wire crossings that are located closer to the sparser destination terminals.

The wire routing algorithm described above refers to routing wires from a block in one X-rank to a block in another X-rank. In some embodiments, the blocks in different X-ranks may be divided into multiple groups such that no block from one group has any wire going into any block from another group. The above-described wire routing algorithm may be applied separately to each of the groups in order to route the wires between blocks in the groups.

Figure 21:
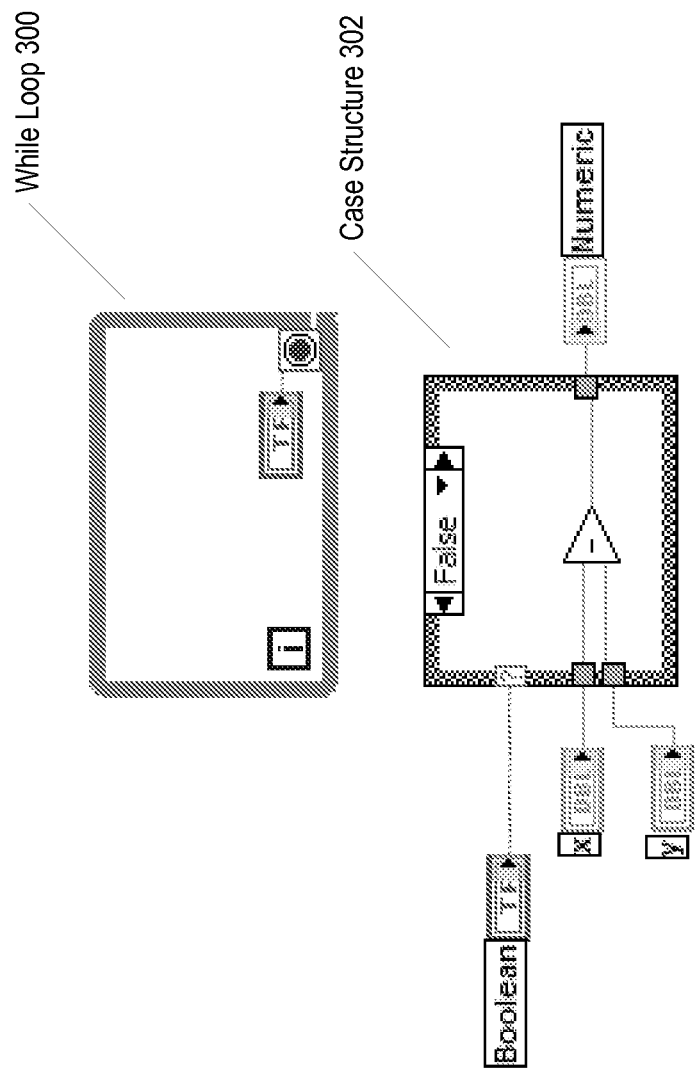
FIG. 21 illustrates two examples of LabVIEW structure nodes, a while loop and a case structure node.

The above-described examples illustrate simple nodes that have input and output terminals. In addition to such simple nodes, some graphical programming development environments may utilize more complex nodes, such as nodes that have elements other than just input and output terminals. For example, the LabVIEW graphical programming development environment uses various types of structure nodes. FIG. 21 illustrates two examples of LabVIEW structure nodes, a while loop 300 and a case structure 302.

Figure 22:
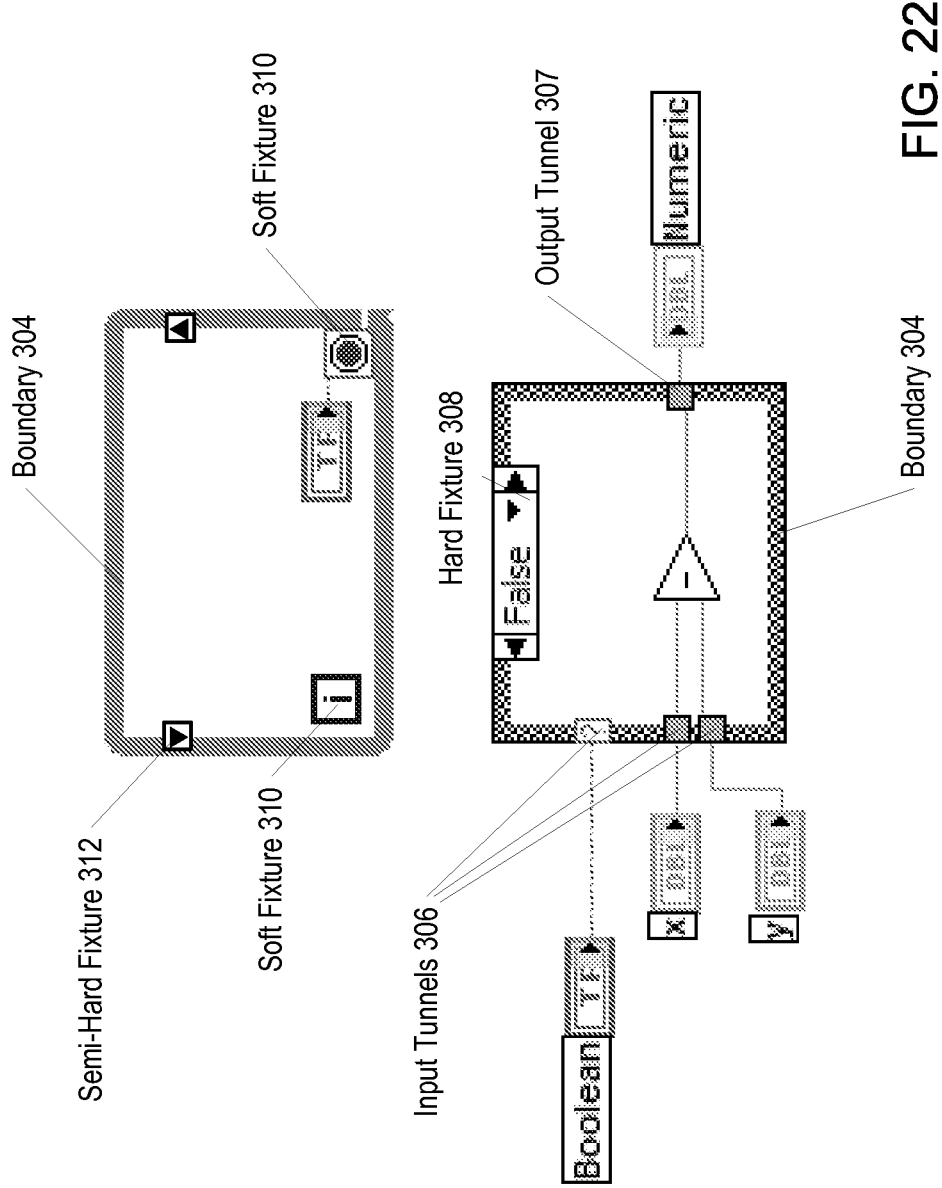
FIG. 22 illustrates various elements of the while loop and case structure and illustrates various terms used in describing how the algorithm treats these nodes.

The block diagram organization algorithm may use specialized techniques for handling complex nodes such as illustrated in FIG. 21. FIG. 22 illustrates various elements of the while loop 300 and case structure 302 and illustrates various terms used in describing how the algorithm treats these nodes.

Both the while loop 300 and the case structure 302 have a boundary 304 which surrounds or encloses a sub-diagram. For example, the sub-diagram of the while loop 300 includes one or more nodes which are executed in a loop. The case structure 302 may include multiple sub-diagrams which are stacked on top of each other, where only one sub-diagram is visible at a time. Each sub-diagram represents a case, and the appropriate sub-diagram is executed depending on which case is true.

As shown in FIG. 22, the case structure 302 includes input tunnels 306 through which wires connect from outside the case structure 302 to nodes in the sub-diagrams of the case structure 302 to provide input to these nodes. The input tunnels 306 also include a selector terminal to which data is wired to select the case. Similarly, the case structure 302 includes an output tunnel 307 through which a wire connects from the sub-diagrams of the case structure 302 to a node outside to provide output to the outside node. Other examples of tunnels in LabVIEW include shift registers. The position of the tunnels along the boundary or border 304 affects not only the positioning of nodes in the sub-diagram of the structure but also affects the positioning of the nodes outside the structure.

Some elements of the structure nodes may have restricted mobility. These elements can be categorized into 3 categories: soft fixtures 310, hard fixtures 308, and semi-hard fixtures 312. Soft fixtures 310 are those elements that have a desired default or de-facto location in the sub-diagram of the structure, but can be placed anywhere in the sub-diagram. For example, the while loop in FIG. 22 includes a termination node and iteration node, which are designated as soft fixtures 310. Hard fixtures 308 have a fixed location in the sub-diagram of the structure, and thus the algorithm needs to leave enough space for them. For example, the case structure in FIG. 22 includes a case indicator, which is designated as a hard fixture 308. Semi-hard fixtures 312 have restricted placement within the sub-diagram but can still be re-position within certain constraints to yield a cleaner block diagram. For example, the while loop in FIG. 22 illustrates shift registers which are designated as semi-hard fixtures 312.

In various embodiments any of various methods may be used to handle structure nodes that have sub-diagrams. Two examples of methods used to treat structure nodes are referred to herein as a hard boundary method and a soft boundary method. In the hard boundary method, the sub-diagram is organized (i.e., nodes are re-positioned within the sub-diagram) as if the entire content of the sub-diagram is an independent diagram. The input tunnels may be treated as the root nodes in a graph, and the output tunnels may be treated as leaf nodes. These restrictions may be added to the input and output tunnels to remain in first and last X-rank, respectively.

Thus, the sub-diagram of the structure node may be automatically organized in a recursive manner. Once the sub-diagram is organized, the whole sub-diagram is treated just like any other node in the containing block diagram, where the tunnels on the boundary are treated as input and output terminals. Thus, the containing diagram may be solved similarly as described above.

Figure 23:
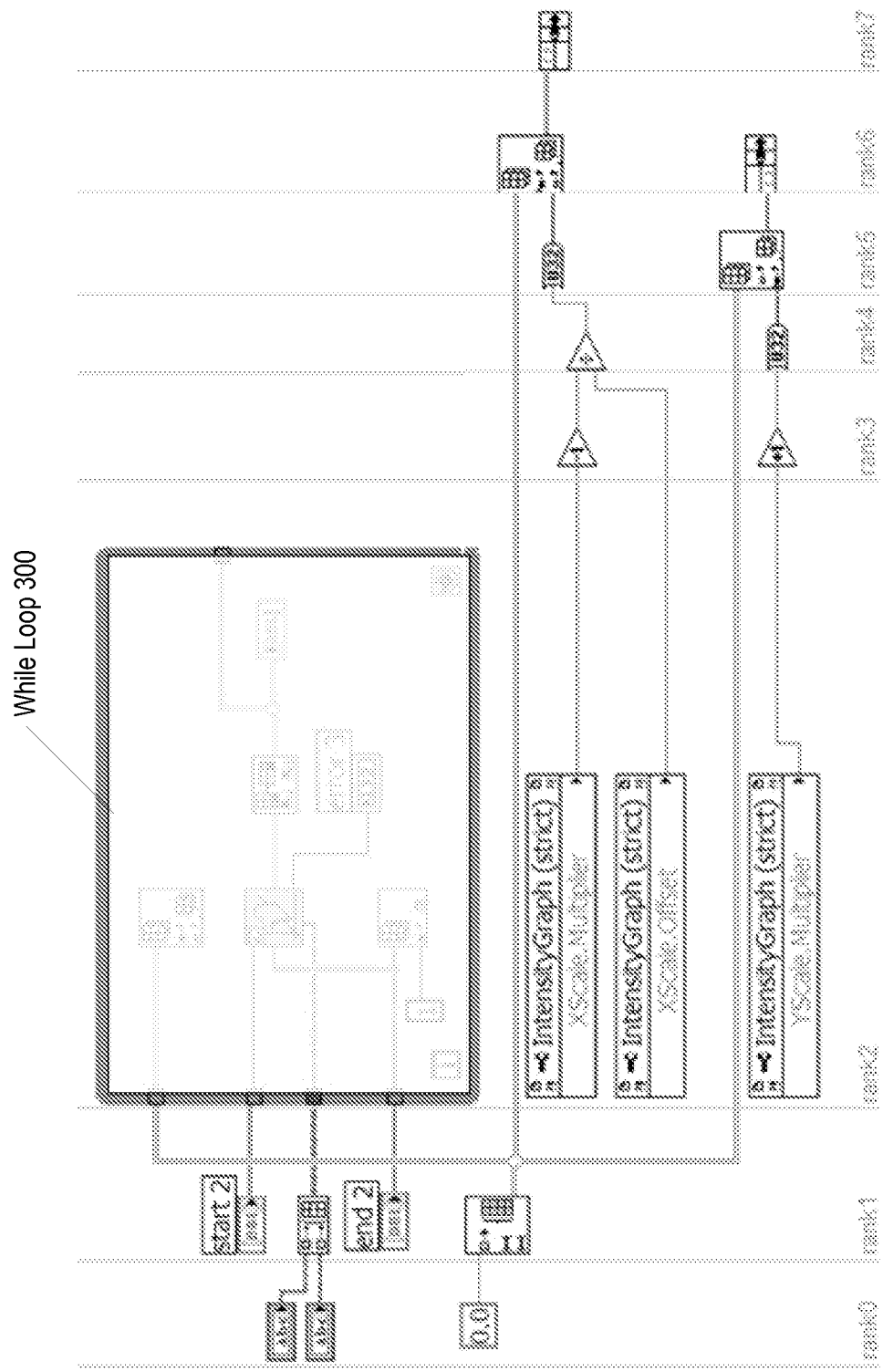
FIG. 23 illustrates an example of a block diagram that includes a while loop, in which a hard boundary method is used to organize the block diagram.

FIG. 23 illustrates an example of a block diagram that includes a while loop 300. The while loop 300 encloses a sub-diagram that has a plurality of interconnected nodes. In this example, the hard boundary method is used. Thus, the sub-diagram of the while loop 300 may be automatically organized by treating it as an independent block diagram. When the block diagram that contains the while loop 300 is automatically organized, the while loop 300 may be treated similarly to any other node in the block diagram. As shown, the while loop 300 has been assigned an X-rank of 2 and aligned with other nodes in the same X-rank.

In the hard boundary method, since the entire structure node is treated like any other node, the X-rank that contains the structure node may be very wide, e.g., as illustrated in FIG. 23. This may result in a lot of blank space in the resulting block diagram. Also, one diagram (either the sub-diagram or the outer diagram) determines the position of the tunnels, which constrains the organization of the other diagram. Also, the sub-diagram is organized by performing the block diagram organization algorithm recursively, which may be relatively costly performance-wise.

Figure 24:
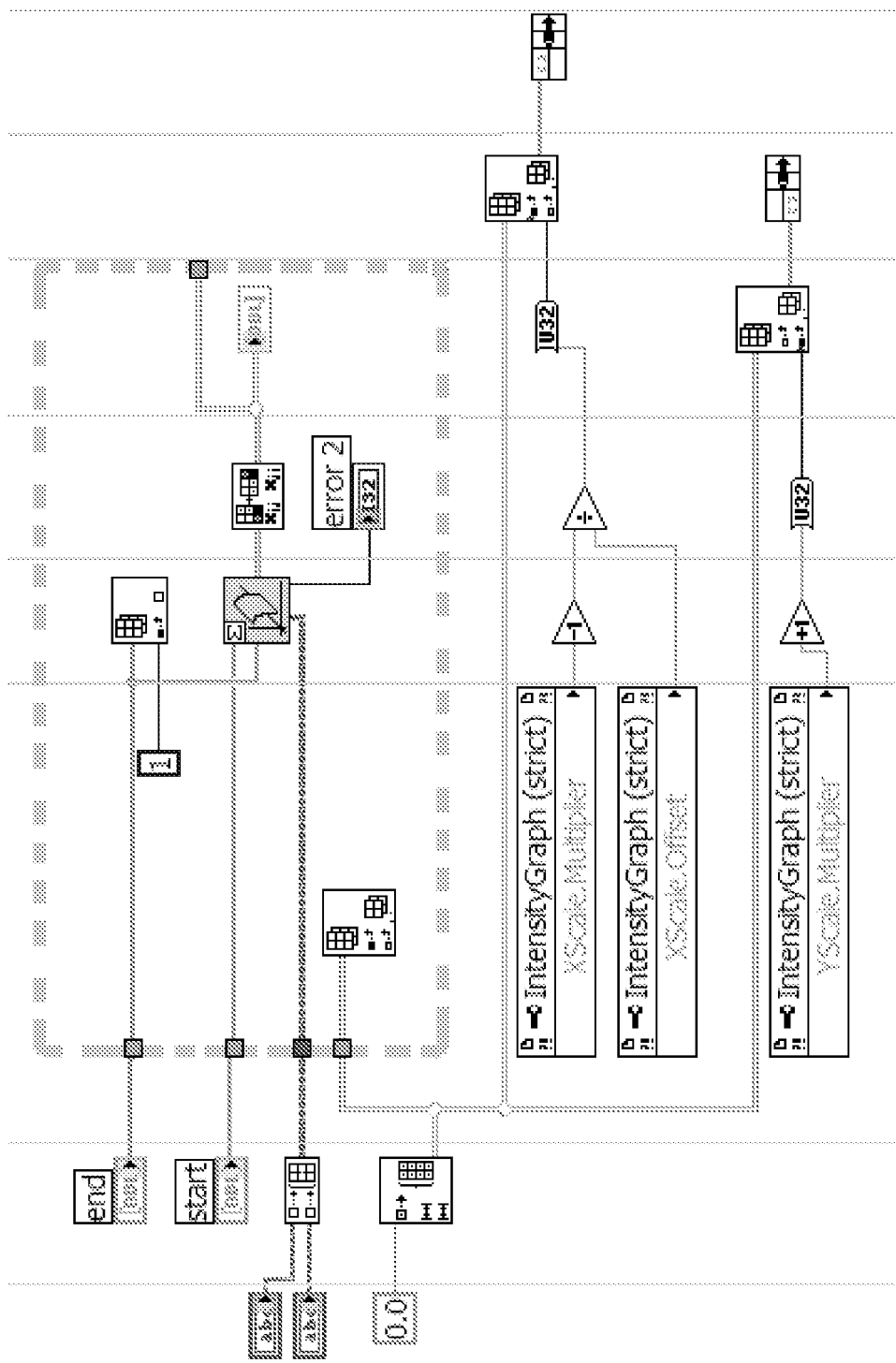
FIG. 24 illustrates the same graphical program of FIG. 23, where a soft boundary method is used instead of the hard boundary method.

In other embodiments, a soft boundary method may be used instead of the hard boundary method, which may result in a more aesthetically pleasing graph with the algorithm also running very fast. In the soft boundary method, the boundary of the loop or other structure node is temporarily removed, and the nodes within the sub-diagram are treated together with the nodes outside the boundary. As described below, certain constraints may be added so that the nodes in the sub-diagram remain grouped together so that the boundary can then be drawn around them after the positions of the nodes have been set. FIG. 24 illustrates the same graphical program of FIG. 23, where a soft boundary method is used instead of the hard boundary method. In this example, the nodes in the graphical program are more evenly spread, and the tunnels of the while loop are fixed in a better position.

In the soft boundary method, extra constraints to the block diagram organization algorithm may be added, and guard blocks may be inserted to ensure that the nodes in the sub-diagram of the structure node do not move outside of their boundary, and other nodes do not enter the sub-diagram. Thus, the block diagram organization algorithm may be modified to account for these extra constraints and guard blocks. For example, the block diagram organization algorithm may utilize a modified simplex algorithm as described below.

The top part of FIG. 25 illustrates an example graphical program which includes a while loop 300 with a border which encloses a sub-diagram 807. As shown, nodes in a first portion 806A of the outer diagram which contains the while loop 300 may be connected to nodes in the sub-diagram 807 through input tunnels. Similarly, nodes in the sub-diagram 807 may be connected to nodes in a second portion 806B of the outer diagram through output tunnels.

The bottom part of FIG. 25 illustrates the addition of guard blocks and constraints by the block diagram organization algorithm. Guard blocks G1, G2, G1' and G2' have been added at the corners of the loop border. The purpose of the guard blocks is to hold the guard wires W, W', w1, w2, w1' and w2', which have also been added, as shown in FIG. 25. The guard wire W connects guard block G1 to G1'. The guard wire W' connects guard block G2 to G2'. The guard wire w1 connects guard block G1 to the input tunnel t1. The guard wire w1' connects guard block G1' to the input tunnel t3. The guard wire w2 connects guard block G2 to the input tunnel t2. The guard wire w2' connects guard block G2' to the input tunnel t4.

The guard wires are classified as either impermeable guard wires or semi-permeable guard wires. In particular, guard wires W and W' are classified as impermeable guard wires, and the other guard wires are classified as semi-permeable guard wires. A weight of infinity is assigned to the impermeable guard wires W and W', as indicated in FIG. 25. These are the wires with infinite weight. This keeps these wire straight. Any wires crossing these wires will result in an infinite crossing value as well, which ensures that no crossing happens across these wires. These properties ensure that the loop boundary is respected vertically, keeping the sub-diagram 807 within the vertical limit and preventing the outer diagram 806 from seeping in through this vertical boundary.

The semi-permable guard wires result in crossing value 0 when crossed with each other or with inbound/outbound wires. The crossing value will be infinity if a semi-permeable guard wire crosses with any other wire. This ensures that the outer diagram 806 does not seep in to the sub-diagram 807 from left or right, thus maintaining the horizontal boundary of the sub-diagram.

As noted above, a simplex algorithm may be used in computing positions of nodes in the block diagram. Mathematically, having an infinite weighted wire will never end the simplex algorithm since the result of all equations will be infinity. At the same time, having a finite weighted wire might end up pulling the wire due to weights of remaining wire. Thus, in the algorithm used to organize the block diagram, the weight of these hard-wires may be set to be a finite large value that is large enough to ensure that vertical ordering gives preference to that wire and small enough for the LP to have a finite solution boundary (and hence terminating the simplex).

Thus, guards are responsible for holding the structure sub-diagram together. Some of the guard connections are required until the X-rank calculation has been computed, some are required until the Y-rank calculation has been computed, and some are required through the end of the algorithm.

Figure 26:
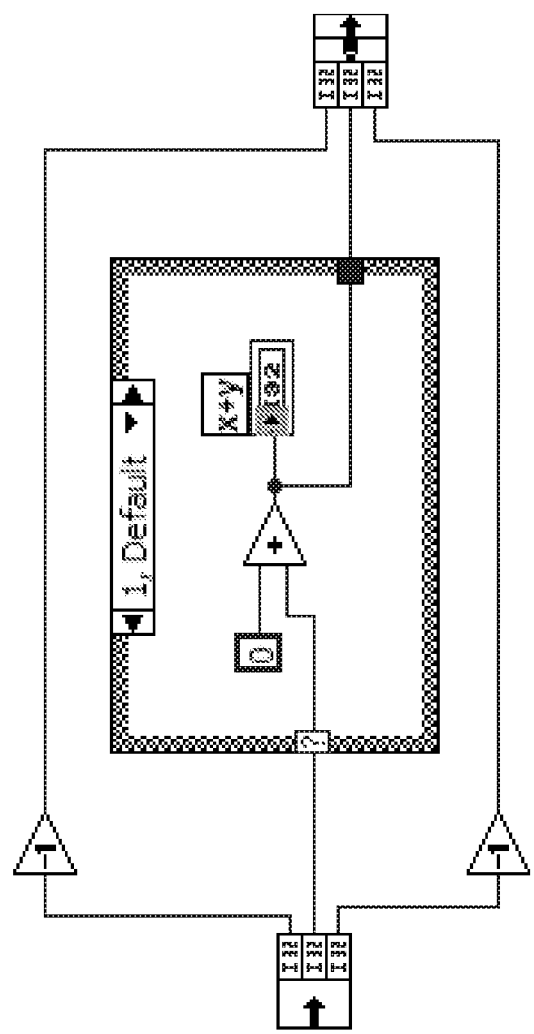
FIG. 26 illustrates an example LabVIEW graphical program that includes a case structure node which bounds sub-diagrams which are stacked on top of each other.
Figure 27:
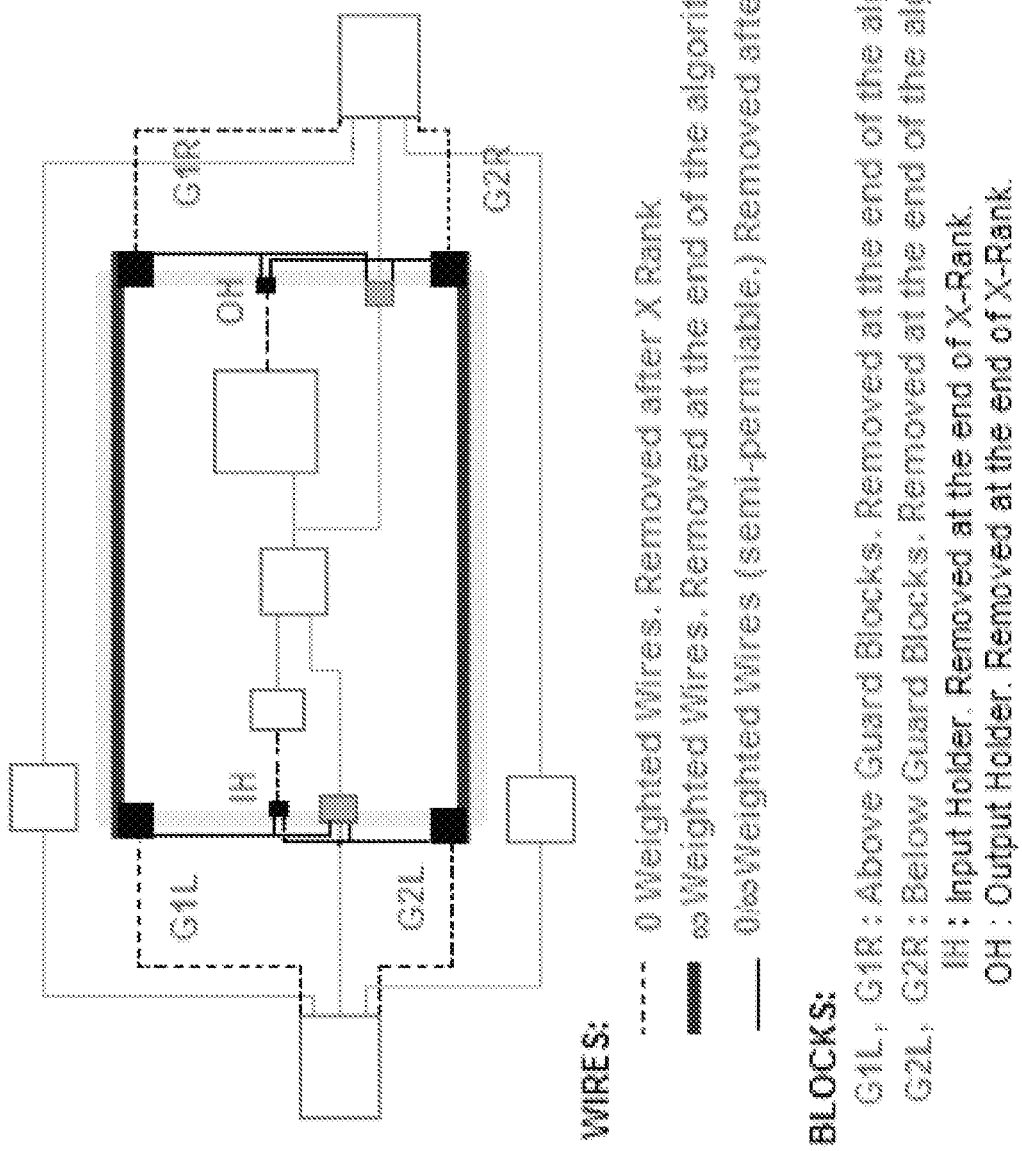
FIG. 27 illustrates the use of guard blocks and guard wires for a soft boundary method used to organize the nodes in the graphical program of FIG. 26.

FIG. 26 illustrates an example LabVIEW graphical program that includes a case structure node which bounds sub-diagrams (which are stacked on top of each other). FIG. 27 illustrates the use of guard blocks and guard wires for a soft boundary method used to organize the nodes in the graphical program.

As indicated in FIG. 27, four guard blocks (G1L, G1R, G2L and G2R) are positioned at the corners of the case structure boundary. One Input Holder block (IH) and one output holder block (OH) are present in this example. Blocks IH and OH will be present only if the structure has any input blocks (controls, constants etc., with inputs=0) and any output blocks (indicators, etc. with outputs=0.) These blocks are responsible for the horizontal containment of the input and output blocks. Each of the nodes that have a connection with the entering tunnel will also have two zero-weighted wires connecting from the node to the G1L and G2L blocks. In addition, each of the nodes that have a connection from the exiting tunnel has two inputs from G1R and G2R. These connections are required for performing the X-ranking. These are responsible for maintaining the structure's horizontal boundary. The OH and IH blocks are removed at the end of the X-ranking. The semi-permeable wires ensure that only the wires corresponding to the tunnel can enter the horizontal boundary of the structure. These wires are removed at the end of the X-Ranking.

The algorithm needs to take into account the crossing weights while doing the vertical ordering. In addition, the vertical ordering cannot be a greedy local transposition sort, e.g., a sort which only looks at one stage at a time. Instead, the algorithm may use either look-ahead or backtracking DP. Using a complete DP may result in a very nicely organized block diagram, but may be inefficient to perform. Thus, the algorithm may instead use a simple look-ahead solver that looks ahead and places the nodes until the outermost 'closing' guard blocks are placed.

Figure 28:
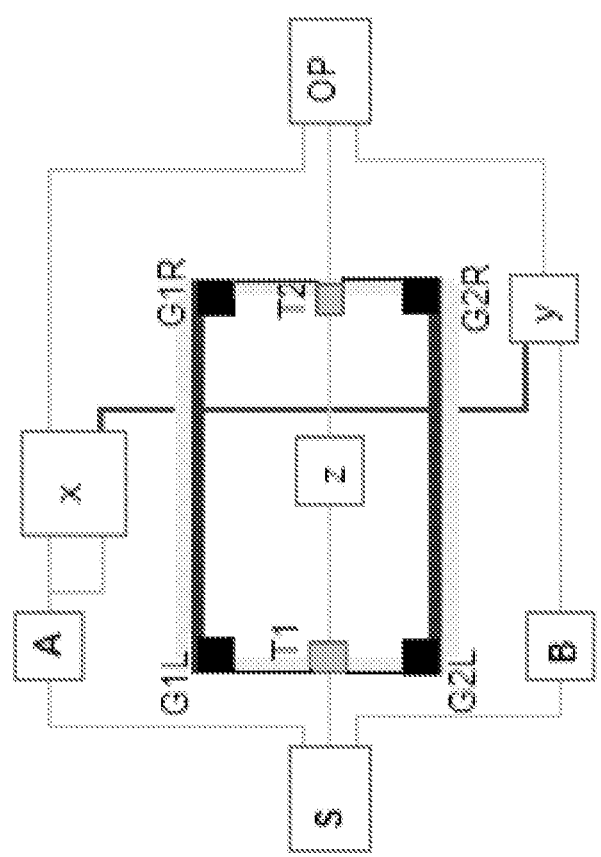
FIGS. 28-31 illustrates an example of using guard blocks and constraints in a soft boundary method.

The median sort needs to ensure that vertically the blocks remain intact and the connected blocks do not split across the structure leading to wires going under the structure, as illustrated in FIG. 28. This would also lead to infinite crossings.

The median sort may operate to get the median of the ranks of the input blocks. The median sort may be done recursively for each of the diagrams in the current rank. The top guard block (G1L) represents the starting point of the diagram, and everything else will be placed underneath the G1L.

Consider the example of FIG. 28. In the X-rank 0 is Block S whose rank is 0. Unlike standard median sort algorithms in which all the blocks in X-rank 1 (blocks A, G1L, T1, G2L and B) would get Y-rank 0, here the block A gets Y-rank 0, block T1 gets Y-rank 1, and block B gets Y-rank 2, as the terminals induce these ranks enabling them to be positioned optimally across the terminals.

Consider the X-rank 1 (blocks A, B, G1L, G2L and T1). The algorithm needs to ensure that block T1 remains within blocks G1L and G2L. In addition, block G2L comes after G1L. In order to achieve this, for the first go at the median sort, blocks A, B, G1L are considered. The inputs to G1L here would be all the wires that are owned by structure G1L (in this case T1 only.) Once G1L is placed optimally, median sort is now called on the contents of G1L recursively to place T1 in its ideal position. This will ensure that the vertical containment of the structures is respected.

However, while sorting X-rank 1, blocks A and B may be split up to get the best result for the crossing. In order to give median sort a look-ahead, a temporary connectivity grouping is done. This is done only for the first guard line (the rank containing G1L) till the max-guard line for that guard (the rank containing G2L.)

Figure 29:
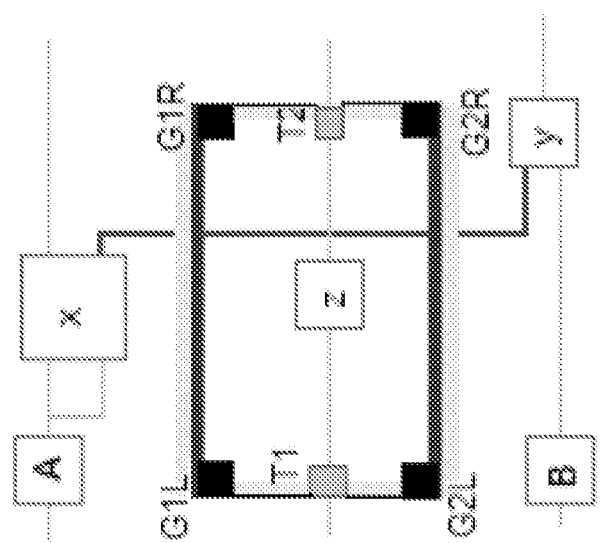

Thus, the portion of the diagram shown in FIG. 29 may be considered. Starting from each of the nodes with 0 input, a connected spanning tree is evaluated. All the nodes in each of the spanning trees gets one particular group ID. Because the wire connected block x to block y is present, there are only two spanning trees, as follows:

Spanning tree 1: A, X, B, Y
Spanning tree 2: G1L, T1, G2L, Z, G1R, T2, G2R

Each spanning tree gets a unique grouping value, which is copied to each of its nodes. Thus, with the x and y blocks connected, the grouping value for blocks A and B will be same. If the x and y blocks were not connected, the grouping value for blocks A and B would be different. Median sort ensures that these groups stay intact.

Figure 30:
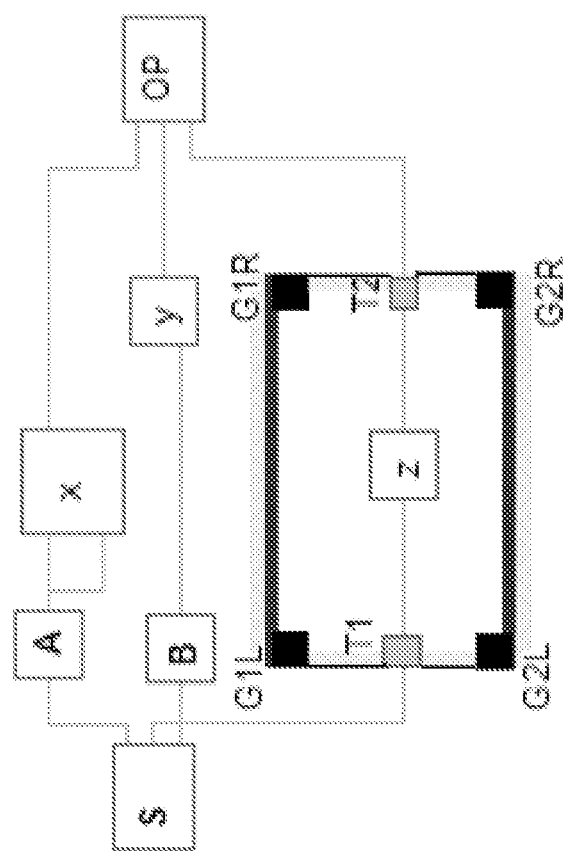
Figure 31:
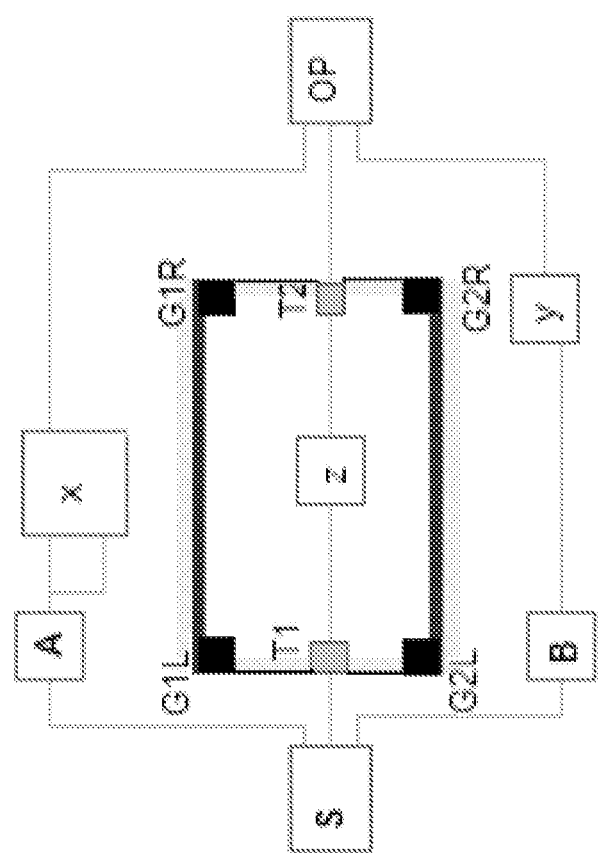

After the above-mentioned median sort in x-rank-I the result will be: [A, G1L, T1, G2L, B]. If there were no wire connecting blocks x and y then the corresponding group-ID array would look similar to: [ST1 (A), ST2 (G1L), ST2 (T1), ST2 (G2L), ST3 (B)]. However, because of the x-y wire, the result is similar to: [ST1 (A), ST2 (G1L), ST2 (T1), ST2 (G2L), ST1 (B)]. Thus, the ST1 group is split by ST2. Median sort again merges these groups using the median of the medians and the min median. This will place each of the groups uniquely in the most optimal position. The diagram that is sorted using this technique would look similar to the diagram shown in FIG. 30. FIG. 31 shows how the diagram may look if there were no wire connected nodes x and y. The grouping values may be used only for the first line (the x-rank having G1L.) Everything afterwards will be automatically handled by the modified median-sort.

While doing the transposition after the median sort, nonsensical transpositions (such as swapping across the boundaries of the guards) are eliminated. A simple iterator that returns the possible new position of the given node within the given X-rank achieves this. Instead of swapping (as done in a standard transposition algorithm), the block is inserted into the new position to ensure structure boundaries are respected.

The crossings may be evaluated based on the following algorithm, shown in pseudocode.

```
int getCrossing(IN Wire w1, IN Wire w2)
BEGIN
    `If there no crossing then no problem
    IF NOT cross(w1, w2) THEN
            RETURN 0
    ENDIF
    `Nothing can cross with Guard Wires
    IF isGuardWire(w1) OR isGuardWire(w2) THEN
            RETURN ∞
    ENDIF
    `Anything can cross with 0 weighted wires.
    IF weight(w1) = 0 OR weight(w2) = 0 THEN
            RETURN 0
    ENDIF
    `... see if w2 is a crossable wire with w1
    `(this is for the case of semi-permeable wires)
    IF semiPermeableWire(w1) THEN
            IF NOT canCross(w1, w2) THEN
                    RETURN ∞
            ELSE
                    RETURN 0
            ENDIF
    ENDIF
    `... and w1 with w2
    IF semiPermeableWire(w2) THEN
            IF NOT canCross(w2, w1) THEN
                    RETURN ∞
            ELSE
                    RETURN 0
            ENDIF
    ENDIF
    `All else fails, these two are two normal wires
    `just return the crossing as a function of the
    `weights of the two wires.
    RETURN crossValue( weight(w1), weight(w2) );
END
DJFint getCrossing(IN Wire w1, IN Wire w2)
BEGIN
    `If there no crossing then nothing to worry
    IF NOT cross(w1, w2) THEN
            RETURN 0
    ENDIF
    `Well... nobody can cross with Guard Wires
    IF isGuardWire(w1) OR isGuardWire(w2) THEN
            RETURN ∞
    ENDIF
    `... and anybody can cross with 0 weighted wires.
    IF weight(w1) = 0 OR weight(w2) = 0 THEN
            RETURN 0
    ENDIF
    `... see if w2 is a crossable wire with w1
    `(this is for the case of semi-permeable wires)
    IF semiPermeableWire(w1) THEN
            IF NOT canCross(w1, w2) THEN
                    RETURN ∞
            ELSE
                    RETURN 0
```

-continued

```
            ENDIF
        ENDIF
    `... and w1 with w2
    IF semiPermeableWire(w2) THEN
        IF NOT canCross(w2, w1) THEN
            RETURN ∞
        ELSE
            RETURN 0
        ENDIF
    ENDIF
    `All else fails, these two are two normal wires
    `just return the crossing as a function of the
    weights of the two wires.
    RETURN crossValue( weight(w1), weight(w2) );
END
```

Figure 32:
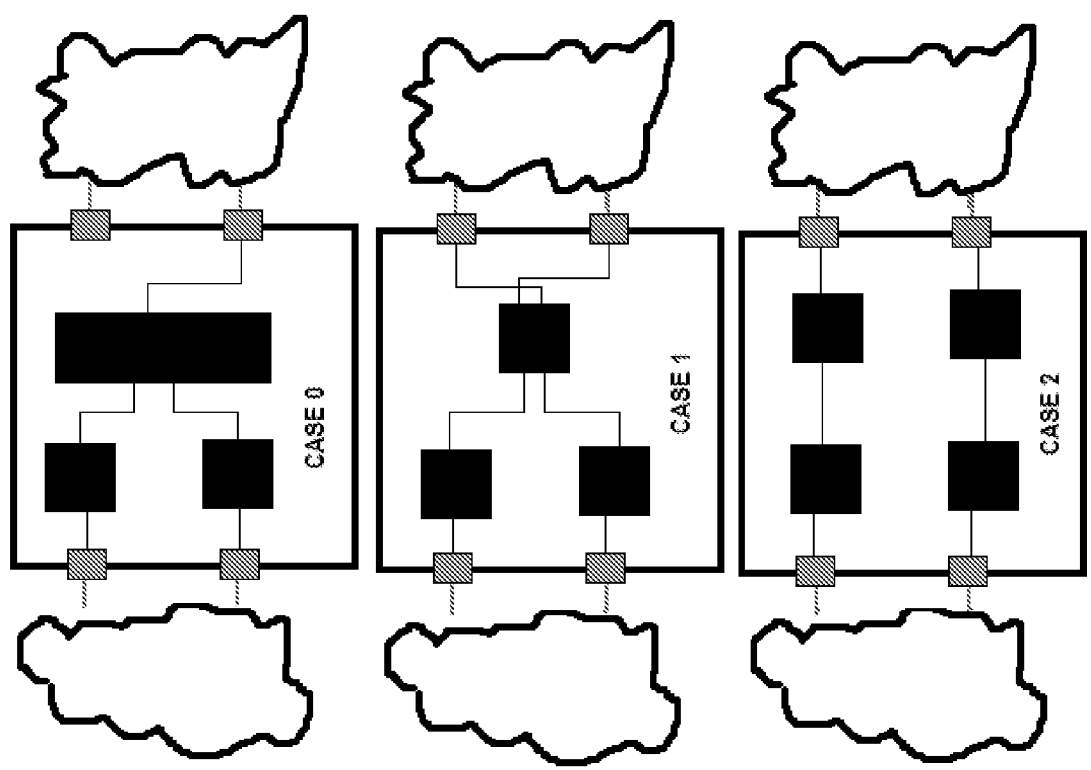
FIG. 32 illustrates three different sub-diagrams for a case structure node, where each sub-diagram corresponds to a different case.
Figure 33:
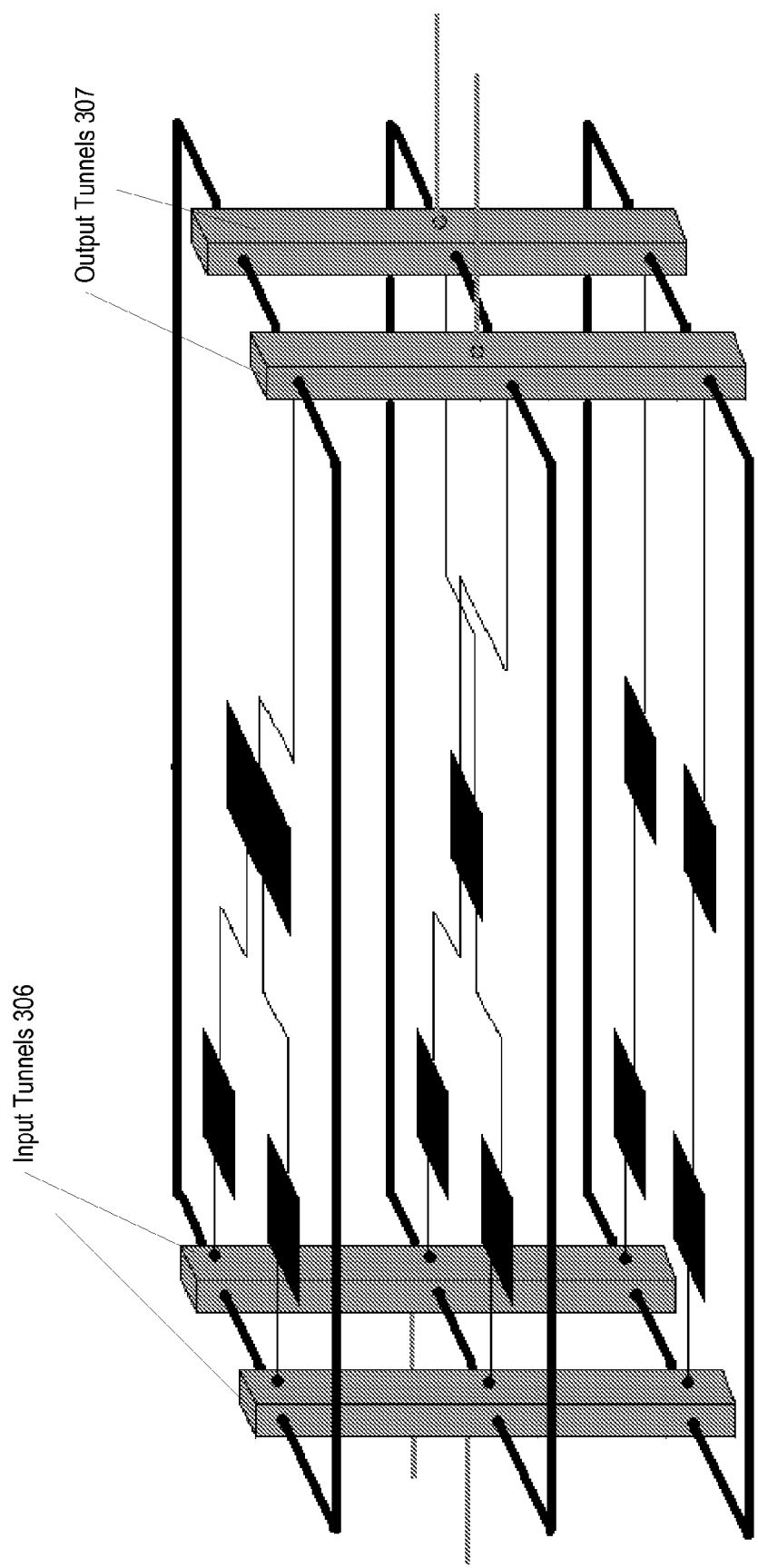
FIG. 33 illustrates that the three sub-diagrams of FIG. 32 are stacked and have input and output tunnels common to all the sub-diagrams.

This algorithm has the following properties. Guard wires: Any crossing with this will introduce infinite crossing. Zero weighted wires: 0 crossing. Semi-permeable wires: Each of the semi-permeable wires knows which are all the wires that can cross with it, so if there is a crossing with any other wire it will induce an infinite crossing, or otherwise it won't introduce any crossing. Friend wires of a semi-permeable wires: 1) All the other semi-permeable wires corresponding to the Guard block of the semi-permeable wire. 2). Wires that are connecting the tunnel As discussed above, some structure nodes, such as case structure nodes may have a plurality of sub-diagrams that are stacked one above the other, with a set of tunnels shared across all the sub-diagrams. For example, FIG. 32 illustrates three different sub-diagrams for a case structure node, where each sub-diagram corresponds to a different case. Only one sub-diagram at a time is visible to the user, depending on which case is selected. As shown in FIG. 33, the sub-diagrams are stacked, and the input and output tunnels are common to all the sub-diagrams.

Since all the sub-diagrams in a stacked structure share the same input and output tunnels, the positioning of these tunnels becomes a point of contention. In some embodiments, the tunnels may be positioned ideally for each sub-diagram, so that the positioning of the tunnels may change each time the user switches between sub-diagrams. However, this may also cause the positioning of objects in the outer diagram to change, which may not be desirable.

In another embodiment, the positioning of the tunnels may be solved based on one of the sub-diagrams, and the tunnels for the other sub-diagrams may be fixed according to the first sub-diagram.

In another embodiment, the tunnels may be positioned based on an average of the ideal tunnel positions for each sub-diagram. For example, for each tunnel, a corresponding child tunnel may be created on each of the sub-diagrams. The positioning of the child tunnels may be solved separately for each sub-diagram. This will fix the child tunnels for each sub-diagram. A connection between the parent and children-tunnels may be created.

In another embodiment, all the sub-diagrams may be merged, and the positioning of the tunnels may be solved based on the merged sub-diagrams. While calculating the Y positions, the blocks of different sub-diagrams are allowed to overlap each other. This may be done by setting the minimum distance condition in the Y position simplex for nodes across the layers to negative infinity. The wire routing may be done for each layer separately. This technique when combined with the soft boundary method may yield a very good result for the block diagram layout and may do so in a computationally efficient way. In the soft boundary method, tunnels are already placed in the most optimal order, so no special ordering needs to be done.

Figure 34:
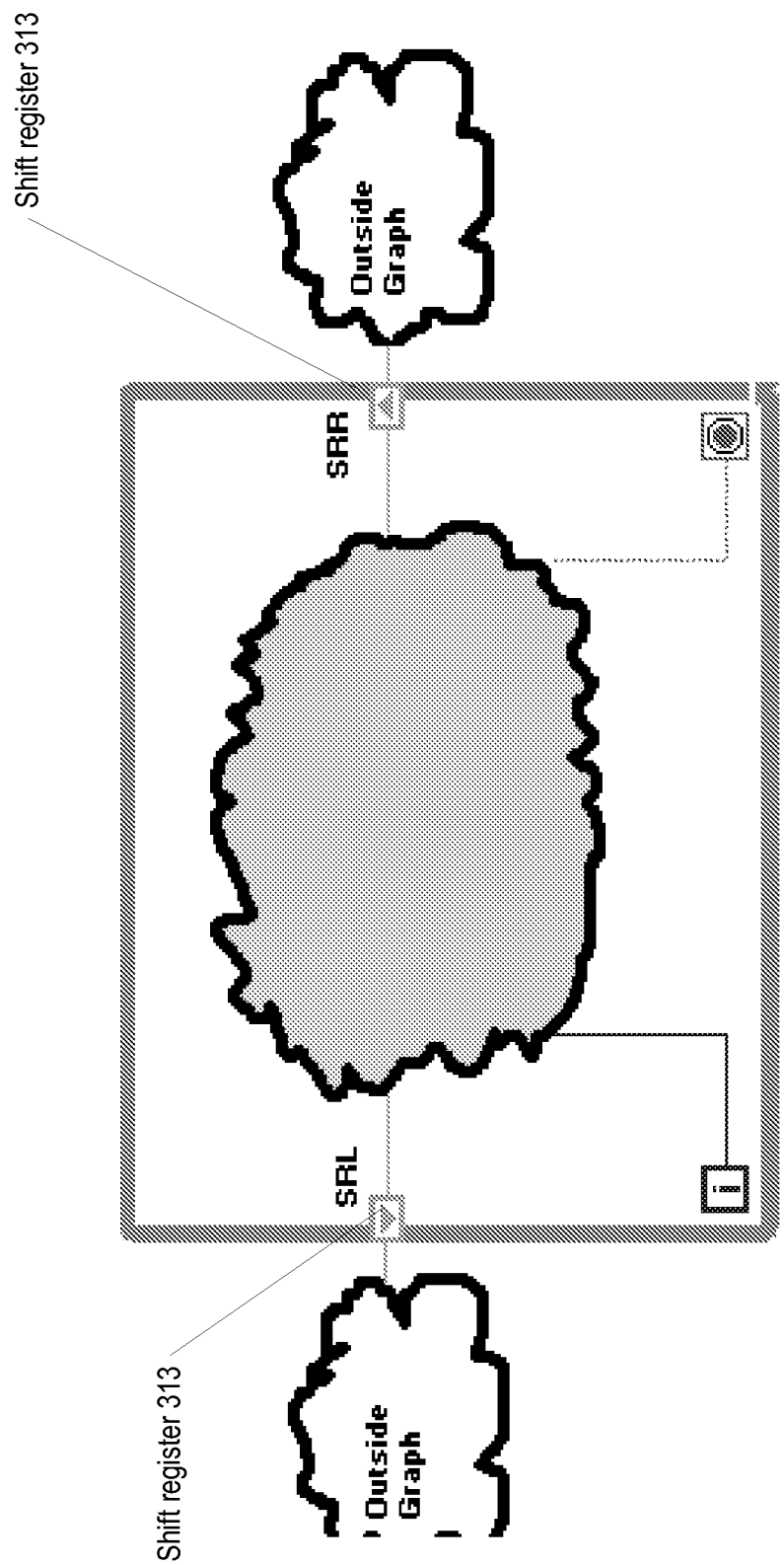
FIG. 34 illustrates an example of a while loop structure node that includes shift registers that need to remain in a straight line with respect to each other.

FIG. 34 illustrates an example of a while loop structure node that includes shift registers 312, labeled as SRL and SRR. Irrespective of the nodes' alignments in the sub-diagrams (denoted by the 'clouds'), the shift registers 312 should remain in a straight line with respect to each other.

Figure 35:
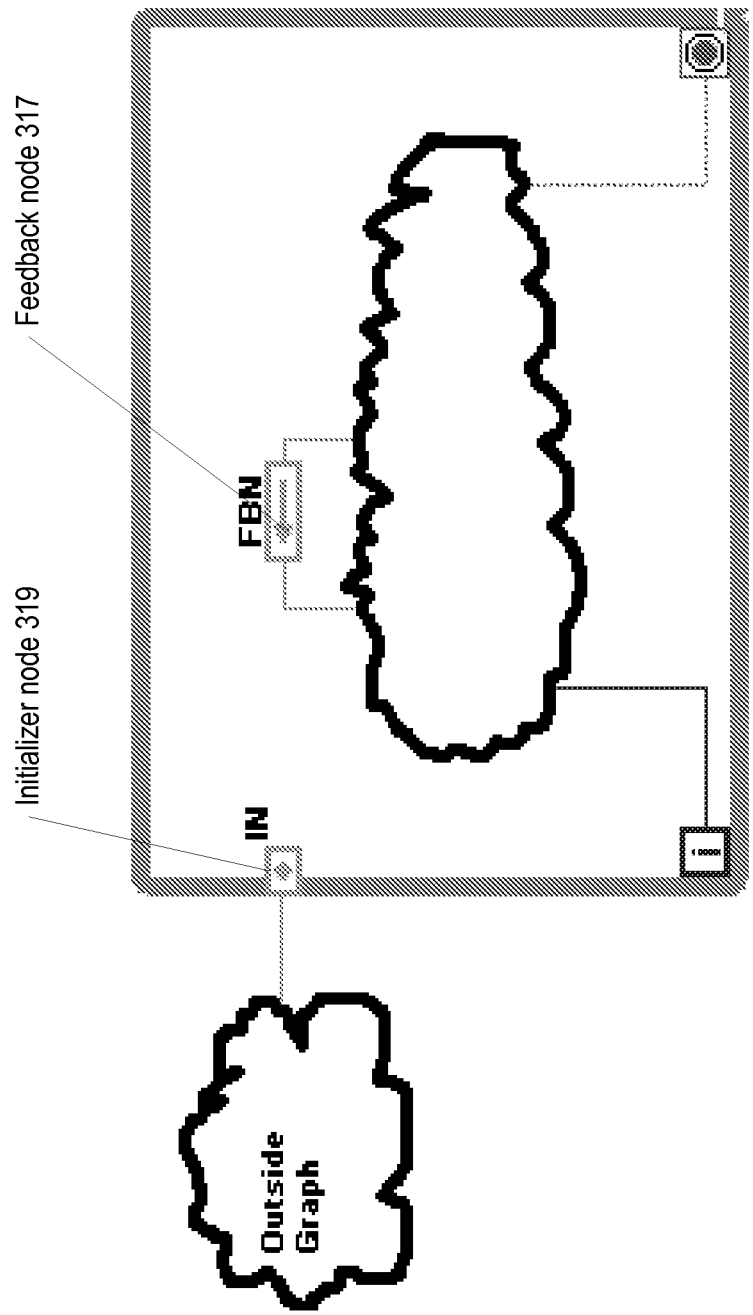
FIG. 35 illustrates an example of a while loop which includes a feedback node and initializer node that need to remain in a straight line with respect to each other.

FIG. 35 illustrates an example of a while loop which includes a feedback node 317 and initializer node 319, labeled as FBN and IN, respectively. Similarly as the shift registers 312 of FIG. 34, the feedback node 317 and initializer node 319 need to remain in a straight line with respect to each other.

Figure 36:
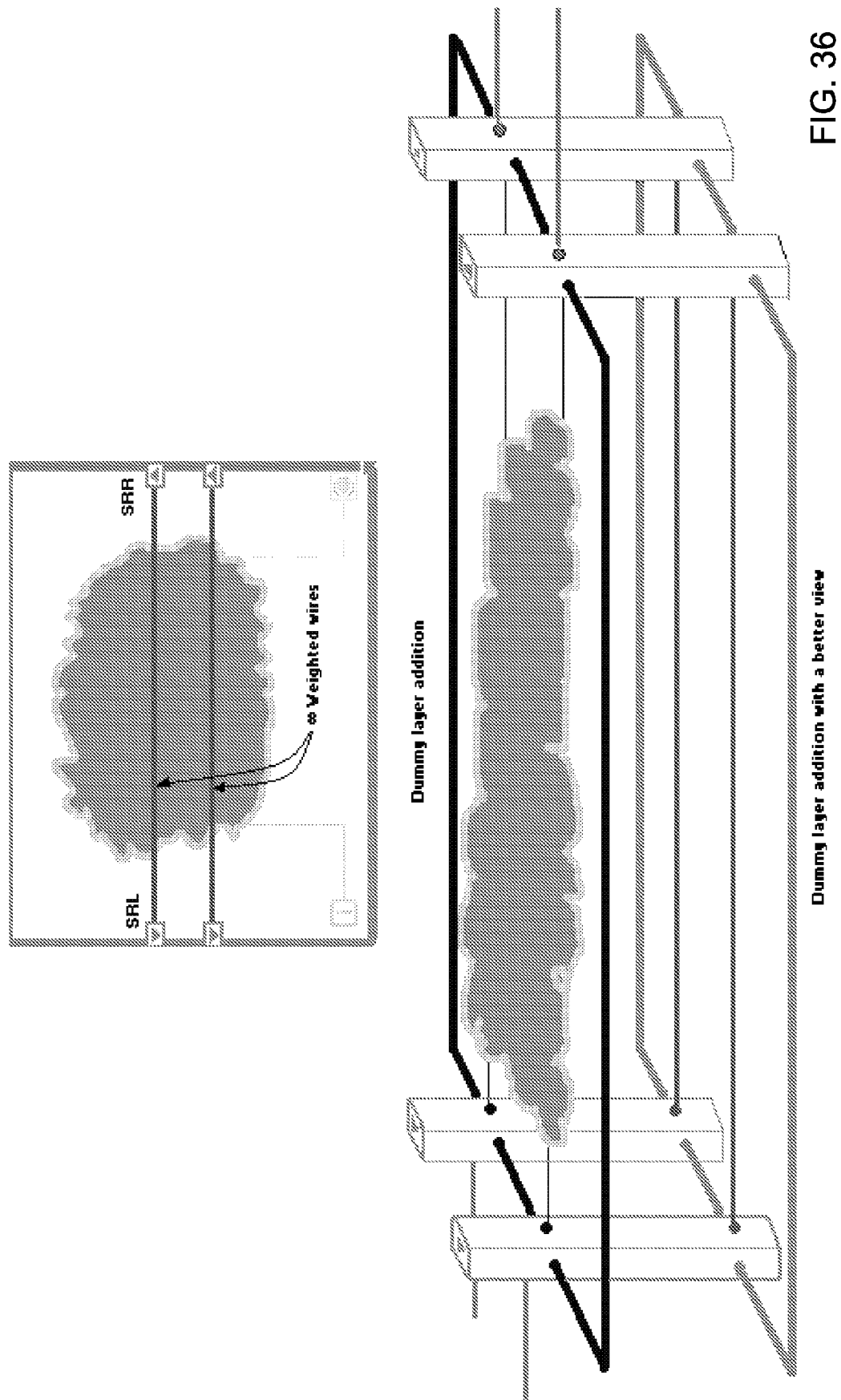
FIG. 36 illustrates an infinite weighted wire connecting the shift registers in the example of FIG. 34.

To maintain the constraints in the examples of FIG. 34 and FIG. 35, a dummy sub-diagram or layer may be created, and the nodes that need to remain in a straight line may be connected with infinite weighted wire. In the example of FIG. 34, the shift registers SRL and SRR may be connected with an infinite weighted wire in a second diagram, as illustrated in FIG. 36. The fact that the new wire is in another layer or sub-diagram allows the sub-diagram to be solved without worrying about placeholders for the wire. At the same time, the infinite weighted wire ensures that the shift registers are pulled in-line during y-placement as the y-placement ensures to tighten such edges. In a similar manner, in the example of FIG. 35, the feedback node FBN and initializer node IN may be connected with an infinite weighted wire in a second diagram to keep the feedback node FBN and initializer node IN in a straight line.

In some graphical programs there may be disjoint groups of nodes, where none of the nodes in one group are connected to any of the nodes in the other groups. The block diagram organization algorithm may position the groups with respect to each other so that they are positioned in an aesthetically pleasing way and also a functional and logical way. In some embodiments, disjoint groups may be placed one below the other.

Figure 37:
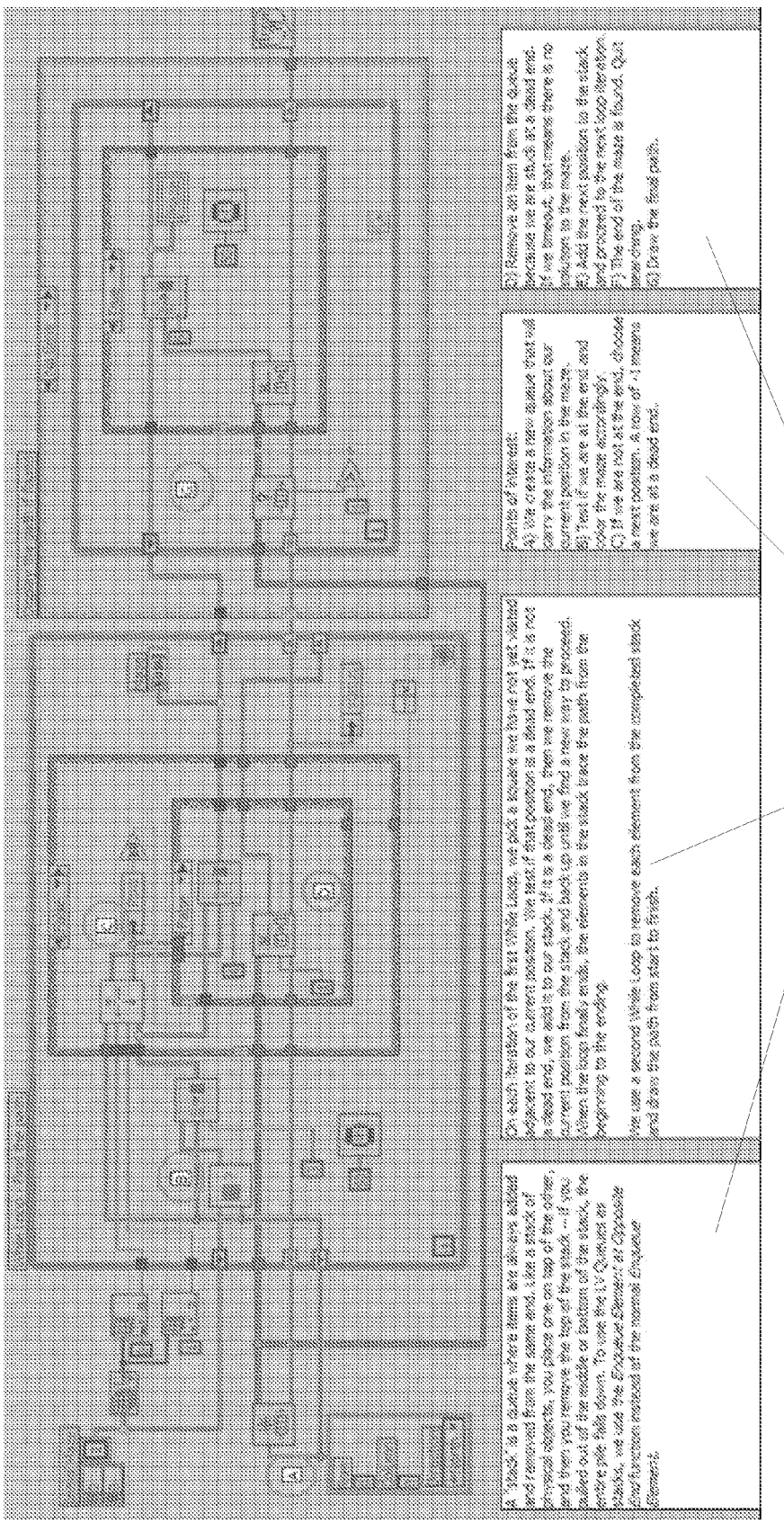
FIG. 37 illustrates an example of a block diagram after the organization algorithm has automatically re-positioned objects in the block diagram, where comment blocks have been positioned appropriately in order to maintain logical connections between the comment blocks and the portions of the block diagram which they describe.

For some types of disjoint groups it is necessary to analyze the logical connections of the groups and place the groups so that the logical connection is maintained. For example, the graphical program may include one or more comment blocks which are not connected to other blocks and thus form disjoint groups. The algorithm may operate to analyze where the comment blocks are originally placed with respect to other objects in the block diagram (e.g., nodes, wires, or groups of nodes), and in the resulting organized diagram, the comment blocks may be placed so as to maintain the relative positioning. FIG. 37 illustrates an example of a block diagram after the organization algorithm has automatically re-positioned objects in the block diagram, where comment blocks 960 have been positioned appropriately in order to maintain logical connections between the comment blocks 960 and the portions of the block diagram which they describe.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-readable memory medium comprising program instructions executable to:
   display a graphical program on a display, wherein the graphical program includes a plurality of nodes interconnected by wires indicating data flow among the nodes, wherein the plurality of interconnected nodes visually indicate functionality of the graphical program, wherein displaying the graphical program comprises displaying the plurality of interconnected nodes in a block diagram on the display, wherein each of the nodes is initially displayed in the block diagram at a respective initial horizontal coordinate;
   receive a request to automatically organize the graphical program;
   automatically organize the graphical program in response to the request, wherein said automatically organizing comprises:
      horizontally ranking the nodes by assigning each respective node to one of a plurality of horizontal ranks, wherein the horizontal ranks divide the block diagram along a horizontal axis, wherein the nodes are assigned to the horizontal ranks based on how the nodes are interconnected by the wires, wherein assigning the nodes to the horizontal ranks indicates a desired horizontal positioning of the nodes relative to each other, wherein for each source node that is connected to one or more target nodes to indicate data flow from the source node to the one or more target nodes, the source node is assigned to a horizontal rank leftward of the respective horizontal rank(s) to which the one or more target nodes are assigned, wherein the plurality of interconnected nodes includes a first node connected to a second node by a wire indicating data flow from the first node to the second node, wherein the first node is initially positioned rightward of the second node, wherein the horizontal rank to which the first node is assigned is leftward of the horizontal rank to which the second node is assigned; and
      determining a desired horizontal coordinate for each respective node based on the horizontal rank to which the respective node is assigned, wherein one or more of the nodes has a desired horizontal coordinate different from its initial horizontal coordinate; and
      for each respective node with a desired horizontal coordinate different from its initial horizontal coordinate, automatically re-positioning the respective node to its desired horizontal coordinate within the block diagram, wherein the first node is automatically re-positioned leftward of the second node.

2. The non-transitory computer-readable memory medium of claim 1,
   wherein each of the nodes is initially displayed in the block diagram at a respective initial vertical coordinate;
   wherein said automatically organizing further comprises:
      vertically ranking the nodes by assigning each respective node to one of a plurality of vertical ranks, wherein the vertical ranks divide the block diagram along a vertical axis, wherein the nodes are assigned to the vertical ranks based on how the nodes are interconnected by the wires, wherein assigning the nodes to the vertical ranks indicates a desired vertical positioning of the nodes relative to each other;
      determining a desired vertical coordinate for each respective node based on the vertical rank to which the respective node is assigned, wherein one or more of the nodes has a desired vertical coordinate different from its initial vertical coordinate; and
      for each respective node with a desired vertical coordinate different from its initial vertical coordinate, automatically re-positioning the respective node to its desired vertical coordinate within the block diagram.

3. The non-transitory computer-readable memory medium of claim 1, wherein the program instructions are further executable to:
   re-display the block diagram so that each node is displayed at its desired horizontal coordinate.

4. The non-transitory computer-readable memory medium of claim 1,
   wherein the plurality of interconnected nodes includes a first node, wherein the first node is automatically re-positioned from a particular initial horizontal coordinate to a particular desired horizontal coordinate;
   wherein the program instructions are further executable to display an animation that illustrates movement of the first node from the particular initial horizontal coordinate to the particular desired horizontal coordinate within the block diagram.

5. The non-transitory computer-readable memory medium of claim 1,
   wherein said receiving the request to automatically organize the graphical program comprise receiving user input requesting the graphical program to be automatically organized.

6. The non-transitory computer-readable memory medium of claim 1,
   wherein the program instructions are further executable to automatically re-route one or more of the wires within the block diagram.

7. The non-transitory computer-readable memory medium of claim 1,
   wherein the graphical program comprises a graphical data flow program;
   wherein the nodes are assigned to the horizontal ranks according to an algorithm that ensures left-to-right data flow semantics.

8. The non-transitory computer-readable memory medium of claim 1,
   wherein the plurality of interconnected nodes includes a comment block;
   wherein said automatically organizing the graphical program comprises re-positioning the comment block so as to maintain a logical connection with one or more other nodes in the graphical program.

9. The non-transitory computer-readable memory medium of claim 1,
   wherein the plurality of interconnected nodes is a first plurality of nodes;
   wherein the first plurality of nodes includes a node which displays a sub-diagram including a second plurality of nodes;
   wherein said automatically organizing the graphical program comprises automatically re-positioning one or more of the nodes in the sub-diagram.

10. The non-transitory computer-readable memory medium of claim 1,
wherein the plurality of interconnected nodes includes a node which has a plurality of stacked sub-diagrams;
wherein said automatically organizing the graphical program comprises automatically organizing each of the stacked sub-diagrams.

11. The non-transitory computer-readable memory medium of claim 1,
wherein the program instructions are executable to perform said horizontally ranking the nodes without using user input specifying positioning information for the nodes.

12. The non-transitory computer-readable memory medium of claim 1,
wherein the plurality of interconnected nodes includes a third node connected to a fourth node by a wire indicating data flow from the third node to the fourth node, wherein said horizontally ranking the nodes includes:
assigning the third node to a first horizontal rank, wherein the first horizontal rank corresponds to a different horizontal coordinate than the initial horizontal coordinate of the third node; and
performing a compaction algorithm, wherein the compaction algorithm operates to re-assign the third node to a second horizontal rank rightward of the first horizontal rank, wherein said re-assigning the third node to the second horizontal rank reduces a length of the wire that connects the third node to the fourth node.

13. The non-transitory computer-readable memory medium of claim 1,
wherein in performing said automatically organizing the graphical program, the program instructions are executable to reduce a number of points in which the wires that interconnect the plurality of nodes cross each other.

14. The non-transitory computer-readable memory medium of claim 1,
wherein in performing said automatically organizing the graphical program, the program instructions are executable to insert one or more temporary placeholder nodes into the graphical program.

15. The non-transitory computer-readable memory medium of claim 1,
wherein in performing said automatically organizing the graphical program, the program instructions are executable to re-route the wires that interconnect the plurality of nodes, wherein said re-routing includes:
horizontally dividing an area of the graphical program into a plurality of slots; and
for each respective wire of two or more of the wires, assigning the respective wire to a respective one of the vertical slots to cause the respective wire to run vertically within the respective slot.

16. A computer-implemented method comprising:
a computer system displaying a graphical program on a display, wherein the graphical program includes a plurality of nodes interconnected by wires indicating data flow among the nodes, wherein the plurality of interconnected nodes visually indicate functionality of the graphical program, wherein displaying the graphical program comprises displaying the plurality of interconnected nodes in a block diagram on the display, wherein each of the nodes is initially displayed in the block diagram at a respective initial horizontal coordinate;
the computer system receiving a request to automatically organize the graphical program;
the computer system automatically organizing the graphical program in response to the request, wherein said automatically organizing comprises:
horizontally ranking the nodes by assigning each respective node to one of a plurality of horizontal ranks, wherein the horizontal ranks divide the block diagram along a horizontal axis, wherein the nodes are assigned to the horizontal ranks based on how the nodes are interconnected by the wires, wherein assigning the nodes to the horizontal ranks indicates a desired horizontal positioning of the nodes relative to each other, wherein for each source node that is connected to one or more target nodes to indicate data flow from the source node to the one or more target nodes, the source node is assigned to a horizontal rank leftward of the respective horizontal rank(s) to which the one or more target nodes are assigned, wherein the plurality of interconnected nodes includes a first node connected to a second node by a wire indicating data flow from the first node to the second node, wherein the first node is initially positioned rightward of the second node, wherein the horizontal rank to which the first node is assigned is leftward of the horizontal rank to which the second node is assigned; and
determining a desired horizontal coordinate for each respective node based on the horizontal rank to which the respective node is assigned, wherein one or more of the nodes has a desired horizontal coordinate different from its initial horizontal coordinate; and
for each respective node with a desired horizontal coordinate different from its initial horizontal coordinate, automatically re-positioning the respective node to its desired horizontal coordinate within the block diagram, wherein the first node is automatically re-positioned leftward of the second node.

17. The computer-implemented method of claim 16,
wherein each of the nodes is initially displayed in the block diagram at a respective initial vertical coordinate;
wherein said automatically organizing further comprises:
vertically ranking the nodes by assigning each respective node to one of a plurality of vertical ranks, wherein the vertical ranks divide the block diagram along a vertical axis, wherein the nodes are assigned to the vertical ranks based on how the nodes are interconnected by the wires, wherein assigning the nodes to the vertical ranks indicates a desired vertical positioning of the nodes relative to each other;
determining a desired vertical coordinate for each respective node based on the vertical rank to which the respective node is assigned, wherein one or more of the nodes has a desired vertical coordinate different from its initial vertical coordinate; and
for each respective node with a desired vertical coordinate different from its initial vertical coordinate, automatically re-positioning the respective node to its desired vertical coordinate within the block diagram.

18. The computer-implemented method of claim 16, further comprising:
the computer system re-displaying the block diagram so that each node is displayed at its desired horizontal coordinate.

19. The computer-implemented method of claim 16,
wherein the plurality of interconnected nodes includes a first node, wherein the first node is automatically re-positioned from a particular initial horizontal coordinate to a particular desired horizontal coordinate;

wherein the method further comprises the computer system displaying an animation that illustrates movement of the first node from the particular initial horizontal coordinate to the particular desired horizontal coordinate within the block diagram.

20. The computer-implemented method of claim 16, wherein said receiving the request to automatically organize the graphical program comprise receiving user input requesting the graphical program to be automatically organized.

21. The computer-implemented method of claim 16, wherein the method further comprises the computer system automatically re-routing one or more of the wires within the block diagram.

22. The computer-implemented method of claim 16, wherein the graphical program comprises a graphical data flow program;
wherein the nodes are assigned to the horizontal ranks according to an algorithm that ensures left-to-right data flow semantics.

23. The computer-implemented method of claim 16, wherein the plurality of interconnected nodes is a first plurality of nodes;
wherein the first plurality of nodes includes a node which displays a sub-diagram including a second plurality of nodes;
wherein said automatically organizing the graphical program comprises automatically re-positioning one or more of the nodes in the sub-diagram.

24. The computer-implemented method of claim 16, wherein the plurality of interconnected nodes includes a node which has a plurality of stacked sub-diagrams;
wherein said automatically organizing the graphical program comprises automatically organizing each of the stacked sub-diagrams.

25. The computer-implemented method of claim 16, wherein the computer system performs said horizontally ranking the nodes without using user input specifying positioning information for the nodes.

26. A computer system comprising:
one or more processors;
memory storing program instructions; and
a display device;
wherein the program instructions are executable by the one or more processors to:
display a graphical program on the display device, wherein the graphical program includes a plurality of nodes interconnected by wires indicating data flow among the nodes, wherein the plurality of interconnected nodes visually indicate functionality of the graphical program, wherein displaying the graphical program comprises displaying the plurality of interconnected nodes in a block diagram on the display, wherein each of the nodes is initially displayed in the block diagram at a respective initial horizontal coordinate;
receive a request to automatically organize the graphical program;
automatically organize the graphical program in response to the request, wherein said automatically organizing comprises:
horizontally ranking the nodes by assigning each respective node to one of a plurality of horizontal ranks, wherein the horizontal ranks divide the block diagram along a horizontal axis, wherein the nodes are assigned to the horizontal ranks based on how the nodes are interconnected by the wires, wherein assigning the nodes to the horizontal ranks indicates a desired horizontal positioning of the nodes relative to each other, wherein for each source node that is connected to one or more target nodes to indicate data flow from the source node to the one or more target nodes, the source node is assigned to a horizontal rank leftward of the respective horizontal rank(s) to which the one or more target nodes are assigned, wherein the plurality of interconnected nodes includes a first node connected to a second node by a wire indicating data flow from the first node to the second node, wherein the first node is initially positioned rightward of the second node, wherein the horizontal rank to which the first node is assigned is leftward of the horizontal rank to which the second node is assigned; and
determining a desired horizontal coordinate for each respective node based on the horizontal rank to which the respective node is assigned, wherein one or more of the nodes has a desired horizontal coordinate different from its initial horizontal coordinate; and
for each respective node with a desired horizontal coordinate different from its initial horizontal coordinate, automatically re-positioning the respective node to its desired horizontal coordinate within the block diagram, wherein the first node is automatically re-positioned leftward of the second node.

27. The computer system of claim 26, wherein the program instructions are executable by the one or more processors to perform said horizontally ranking the nodes without using user input specifying positioning information for the nodes.

* * * * *